United States Patent
Boukobza et al.

[19]

[11] Patent Number: 6,122,664
[45] Date of Patent: Sep. 19, 2000

[54] PROCESS FOR MONITORING A PLURALITY OF OBJECT TYPES OF A PLURALITY OF NODES FROM A MANAGEMENT NODE IN A DATA PROCESSING SYSTEM BY DISTRIBUTING CONFIGURED AGENTS

[75] Inventors: Marcel Boukobza, Garches; Gerard Sitbon, Vitry, both of France

[73] Assignee: Bull S.A., Louveciennes, France

[21] Appl. No.: 08/884,093

[22] Filed: Jun. 27, 1997

[30] Foreign Application Priority Data

Jun. 27, 1996 [FR] France ................................. 96 08019

[51] Int. Cl.[7] ...................... G06F 15/173; G06F 15/177
[52] U.S. Cl. ...................... 709/224; 709/222; 709/223; 709/243; 709/220; 395/500; 395/118; 395/117; 395/700
[58] Field of Search ..................................... 395/500, 118, 395/117, 200.09, 700; 709/223, 222, 224, 202, 217, 220, 243

[56] References Cited

U.S. PATENT DOCUMENTS

| 5,367,635 | 11/1994 | Bauer et al. | 395/200 |
| 5,491,796 | 2/1996 | Wanderer et al. | 395/200.09 |
| 5,655,081 | 8/1997 | Bonnell et al. | 709/202 |
| 5,659,736 | 8/1997 | Hasegawa et al. | 395/611 |
| 5,682,523 | 10/1997 | Chen et al. | 395/600 |
| 5,684,967 | 11/1997 | McKenna et al. | 395/329 |
| 5,751,964 | 5/1998 | Ordanic et al. | 395/200.54 |
| 5,774,667 | 6/1998 | Garvey et al. | 395/200.52 |
| 5,802,146 | 9/1998 | Dulman | 379/34 |

FOREIGN PATENT DOCUMENTS

| 0609990 | 8/1994 | European Pat. Off. |
| 9205485 | 4/1992 | WIPO . |
| 9527249 | 10/1995 | WIPO . |

OTHER PUBLICATIONS

Hacker D: "Operations Management", ICL Technical Journal, vol. 7, No. 4, Nov. 1,1991, pp. 741–750, XP000268114.

*Primary Examiner*—Le Hien Luu
*Assistant Examiner*—Beatriz Prieto
*Attorney, Agent, or Firm*—Miles & Stockbridge, P.C.; Edward J. Kondracki

[57] ABSTRACT

The present invention relates to a process for monitoring a plurality of object types of a plurality of nodes (N1, N2, . . . , Nn) comprising a management node (MN) in an information system. Monitoring is configured and then distributed in a filtered way from the management node (MN) to autonomous agents (SAA), an autonomous agent being installed in each node to be monitored in order, by providing intertype correlation, either to locally process the different object types or all of the objects of a domain called a global object, defined generically, or to feed back information to be displayed to the graphical interface of the management node, each agent comprising a plurality of specific modules (SM1, SM2, . . . , SMn) specific to the different object types or to a particular domain, each specific module measuring static and dynamic parameters particular to the object type it monitors and collecting said measurements, testing conditions on said parameters relative to predefined thresholds and possibly triggering actions associated with said tested conditions, which parameters, conditions and actions can be modified by the user of the management node.

28 Claims, 1 Drawing Sheet

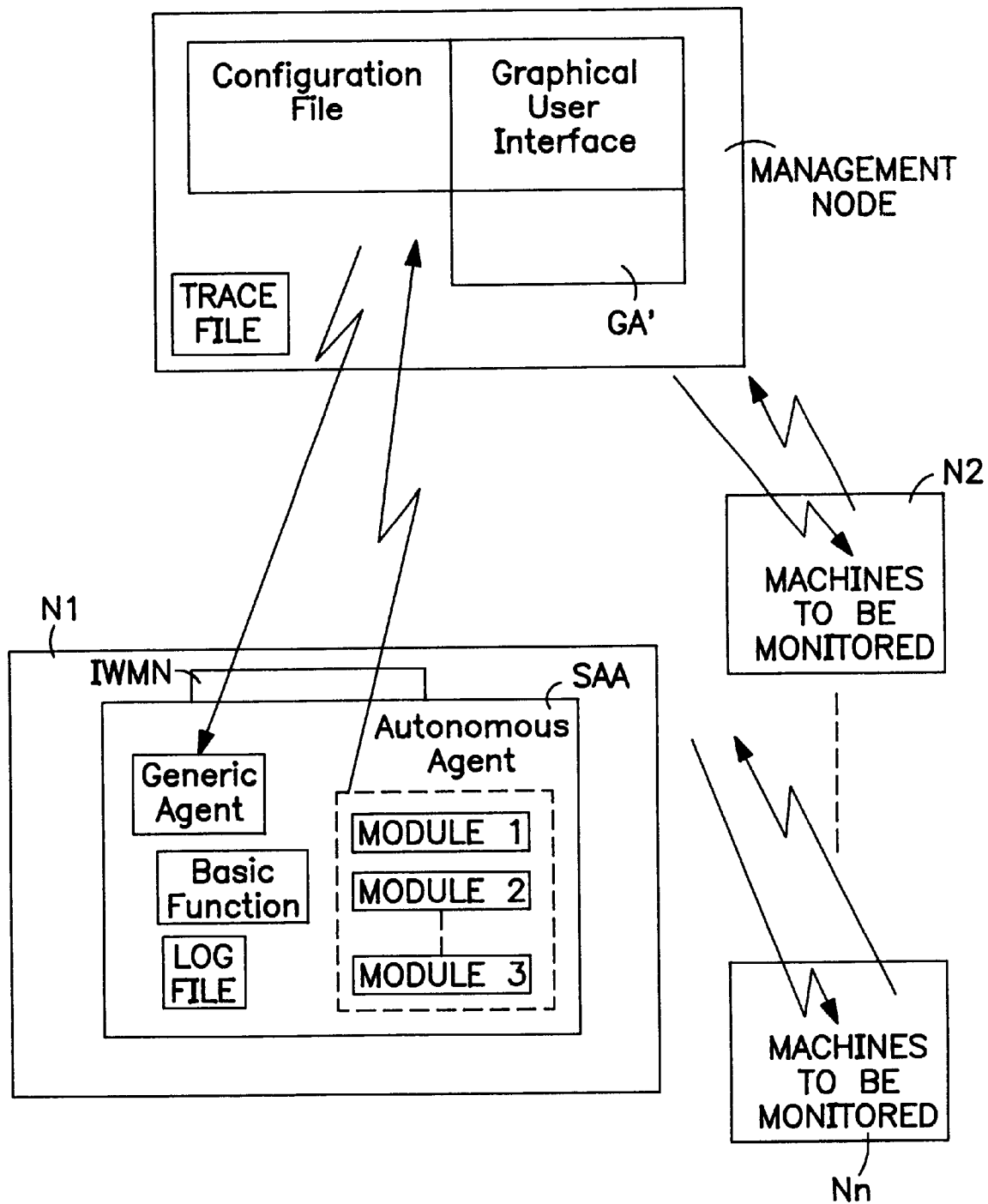

PROCESS FOR MONITORING A PLURALITY OF OBJECT TYPES OF A PLURALITY OF NODES FROM A MANAGEMENT NODE IN A DATA PROCESSING SYSTEM BY DISTRIBUTING CONFIGURED AGENTS

BACKGROUND OF THE INVENTION

1. Field of the Invention

The present invention relates to a process for monitoring a plurality of object types of a plurality of nodes from a management node in a data processing system.

2. Description of the Related Art

Generally, a distributed management environment makes it possible to integrate the management of systems, networks and user applications. The management applications are designed so as to advantageously hide from the user the detailed steps necessary to execute management tasks and to guarantee the integrity of the management information. These applications manage objects by using clear and concise interfaces with the common management services. The common management services make it possible to simplify the development of management applications. Management information base services, usually referred to by one skilled in the art as MIBs (Management Information Bases), allow management applications to manipulate this management information; these services preferably use the applicable standards such as the OSI CMIS/CMIP (Open Systems Interconnection Common Management Information Services/Common Management Information Protocol) and Internet SNMP (Simple Network Management Protocol) standards. A managed object, in this data processing environment, is a representation of a resource such as a machine, a file, a peripheral, a user, an application, etc. An MIB, which is in fact a set of objects, represents the various resources to be managed in a system. An object of a MIB is defined by an object class (corresponding to an object type) and an instance of this object class. A request is sent by an application in order to consult and/or modify an object of the MIB; it is characterized by the type of operation to be applied to one or more of the objects of the MIB. The efficient operation of this type of distributed management environment requires a flexible architecture which allows easy management of different types of objects. More formally, in an environment of this type, the data processing systems are built on distributed architectures, which means that the services required by an application are located in a plurality of systems which communicate with one another, such as for example, transaction processing systems, data base management systems (DBMS), printing services, security systems, directories, etc. This sharing or distribution provides great flexibility and allows significant gains in performance ("cluster"); however, increasing the number of systems to be managed poses a problem, since this increase also has the effect of significantly increasing the probability of abnormal operation in at least one system. One solution to this problem consists of developing management systems controlled by a "manager" (as it is known to one skilled in the art) which controls and directs an entire system through agents whose sole purpose is to execute the requests from the manager, mainly using functions of the "get" or "set" type, and to inform this manager of events related to the system monitored, using a function of the "trap" type. The use of the SNMP protocol and SNMP agents is a current example of an application with this type of organization, which has the main advantage of being simple, but which nevertheless has notable drawbacks, the first of which is that it generates a large amount of traffic on the line between the manager and the agents for the transmission of requests, of the responses to these requests, and of events. Another important drawback relates to the slow reaction time when an event occurs, which is due to the fact that the agent in question must first inform the manager of this event, and the manager must then make a manual or automatic decision relative to this event in order to transmit it to this agent, which in turn executes it and finally reports it to the manager.

SUMMARY OF THE INVENTION

The object of the present invention is to eliminate these drawbacks of the prior art and to offer a process which, among other things, makes it possible to significantly reduce the traffic on the line and the reaction time when events occur, a process which makes it possible to efficiently monitor the operation of one or more applications in a plurality of nodes.

In this respect, the monitoring process mentioned in the preamble is noteworthy in that the monitoring is configured and then distributed in a filtered way from the management node to autonomous agents, an autonomous agent being installed in each node to be monitored in order, by providing intertype correlation, either to monitor as near as possible the different object types or all of the object of a domain called a global object, defined generically, or to feed back information to be displayed through the graphical interface of the management node, each agent comprising a plurality of specific modules specific to the different object types or to a particular domain, each specific module measuring static and dynamic parameters specific to the object type it monitors and collecting these measurements, testing conditions on these parameters relative to predefined thresholds and possibly initiating actions associated with these tested conditions, which parameters, conditions and actions are modifiable by the user of the management node.

Thus, according to the idea of the invention and contrary to all expectation, the use of autonomous agents makes it possible to ensure the proper running of the monitored applications in all of the nodes by means of an autonomous and efficient process, to rapidly feed back the useful information from the nodes to the management node, and to automatically initiate actions on certain conditions or possibly to recommend an action. In this way, in order to ensure effective monitoring of the applications running in the plurality of nodes, the process applied in this case makes it possible to measure specific parameters of each application, to test conditions on these parameters relative to thresholds, and then to execute an action in order to warn of a problem, to reconfigure or to correct. For this reason, measurements are collected in order to perform a later analysis for the purpose of a statistical examination of the monitored activity. These collected measurements relate to all the types of objects to be monitored, for example in this case instances such as data bases like Oracle (trademark of Oracle Corporation) or Informix (trademark of Informix Software, Inc.), applications like Tuxedo (trademark of Novell, Inc.), various machines or any one machine in a system, distributed printing services ("DPF" or Distributed Print Facility: trademark of Xerox Corporation), etc. Correlations can be made between a plurality of different measurements, particularly between different types of objects: inter-type correlation.

The primary user of the process is the administrator of the application or the operator. The only exception is that the operator cannot act directly other than to consult the preconfigured display. Preferably, during the monitoring, the status of the applications as well as the parameter curves selected by the administrator for their importance are displayed, making it possible to verify the proper functioning of the object or objects under supervision. Moreover, if the operator or the administrator desires, in a punctual but interactive way, to view certain more detailed pieces of information, a certain number of possibilities are available to him, such as the display of other measurement curves or the ability to "zoom" on measurements or parts of curves. While generally the object to be monitored is related to a single (basic) object which is part of a production environment, this object can also be a global object (or a global application), that is a set of basic objects containing, for example, one or more data bases as well as an application of the Tuxedo type and possibly other basic objects. These global objects can either be known beforehand and therefore processed in a specific way, or unknown, in which case they are processed as an opaque entity which is opaque but which contains known basic objects. In each agent, installed as near as possible or locally to the objects to be processed, a plurality of specific modules are integrated, each module being specific to an object type such as Oracle, Informix, Tuxedo, UNIX system, distributed print facility (DPF), etc. Each specific module measures parameters specific to the type of object it monitors, and suggests a default list of parameters to be measured, conditions to be evaluated and associated actions. The user has complete latitude to modify these default choices from the management node. Each autonomous agent installed in each node (or machine), in addition to the parameter measurements it performs, the conditions it evaluates (in this node), the actions (reconfiguration, correction, alert) associated with these conditions it initiates or the operations it performs later, feeds back to the management node the information to be displayed, such as for example, the change of state of the objects, the parameter values to be displayed in curve form, etc.

In this way, thanks to the idea of the invention, the management node has excellent global visibility since the present process, once the monitoring has been configured in a filtered way, (which means that a configuration is specific to an object and its environment and that therefore the same object can be configured differently depending on its situation and its distribution), makes it possible to monitor a plurality of object types, to give them unified functions, and also to correlate, among these functions, measurements on different types of objects. The correlation relates to the display of curves, conditions, and associated actions, as well as to the later analysis. It must also be noted that the process must be portable to different platforms, which implies that it is completely independent from its operating environment, since the display occurs by means of a graphical interface specific to this process. This process is designed to allow any interfacing with any management system, in order to offer the user integrated management. The autonomous agents can access different types of information through the existing standard protocols.

Advantageously, for the application of the monitoring process according to the invention, the management node includes, among other things, a graphical user interface for the viewing of selected objects and the display of parameter value curves, a configuration file which contains all of the configurations of the objects with the description of these objects as well as all of the predefined static or dynamic parameters, which file is analyzed and dynamically modified or added to, status files of the nodes to be monitored as well as parameter display files, the parameters measured being stored in a trace file so that they can be displayed by means of the graphical interface.

Remarkably, the autonomous agent installed in each node to be monitored is primarily composed of a generic agent related to a plurality of specific modules, each of which is specific to an object type or to a particular domain, of files containing the basic functions used, each node to be monitored also having its own files of parameters, conditions and associated actions for controlling its own monitoring and thus allowing as near as possible the processing of different types of objects by measuring the parameters, evaluating the conditions and initiating the actions linked to the conditions for all the objects described.

Equally remarkably, when a condition that is not linked to a parameter relates to one or more parameters and thus one or more objects, this condition is processed in the management node by a generic agent which processes the conditions in several nodes, which generic "management" agent initiates the action in the management node.

BRIEF DESCRIPTION OF THE DRAWING

The following description in reference to the appended drawing, given entirely as a non-limiting example, will make it clearly understood how the invention can be embodied.

The sole FIGURE represents, in highly schematic fashion, an exemplary application of the process according to the invention to the intercommunication between a management node and a node to be monitored.

DESCRIPTION OF THE PREFERRED EMBODIMENT

As seen above, the process according to the invention advantageously makes it possible to monitor n machines, that is n nodes, N1, N2, ..., Nn, from a management node MN. For the intercommunication to which the invention relates, the management node MN chiefly comprises a certain number of components, including the graphical user interface GUI and the configuration file CF. The interface GUI makes it possible to show, in the main window on the screen, the objects selected from the list of the objects that can be displayed, with one icon for each object having a color, for example green, orange and red, that depends on its status. Also, when an object is selected and a "zoom" is requested by means of the menu bar, a window with the name of the object is displayed, which contains all the objects which compose this object. The interface GUI also allows the display of parameter value curves, with several curves in the same graph, if desired. During the configuration of the monitoring, a list of graphs can be added to each object described, while a list of parameters to be displayed is associated with each graph. The interface GUI makes it possible to call at least one management tool for each type of object while moreover, the expertise or the stored experience of a user or a user's tool, which is a valuable aid for monitoring, can advantageously be displayed. The configuration file CF contains all of the configurations of the objects with the description of these objects, as well as all of the predefined static or dynamic parameters; it can be analyzed and dynamically modified or added to. By downloading the configuration file, for example, the autonomous agents are installed, via the interface IWMN (of the node N1) with the management node MN, in the nodes to be monitored from the management node MN, a specific command being used to install the autonomous agent SAA, as in the FIGURE, in the node N1. Each node to be monitored has its own files SL ("scanlog") of parameters, conditions and associated actions which allow it to control its own monitoring, while the management node also holds the status files of the nodes to be monitored as well as the parameter display files (a set of "trace" files TF). The updating of the list of the nodes in which an autonomous agent is installed is done automatically by the management node. The starting and stopping of the monitoring process are controlled by the management node. A new object can easily be incorporated by the process according to the invention and monitored by an autonomous agent that has already been configured. An autonomous agent SAA is chiefly composed of a generic agent GA related to specific modules SM (SM1, SM2, . . . , SMn), each of which is specific to an object type or to a particular domain, and of files, one of which is intended to contain the basic functions BF used.

The processing of the conditions can involve several objects, and in this case there is the question of knowing in which nodes the conditions are to be processed. In effect, a condition can be linked to a parameter of an object, and is therefore part of the description of this parameter. A parameter contains the description of its measurement (command to be executed, trace, curve display, etc.), the description of a certain number of single conditions related to the measurement just performed (operator, threshold, etc.) along with, for each condition, the action to be initiated when this condition is true. A parameter is attached to an object which in turn is always associated with a node, so the processing of the parameter and its conditions is carried out in the node associated with the object. On the other hand, a condition cannot be linked to a parameter, so it relates to one or more parameters and thus to one or more objects. In this case, the condition is processed in the management node in which there is also a generic agent GA' which is slightly different from the generic agent GA contained in a node to be monitored in that it processes the conditions in several nodes, which agent GA' initiates the action in the management node. Moreover, a predefined or external action can request the value of a parameter of an object monitored by a node other than the node in which the action is executed. In this case, one of the basic functions BF requesting the value will transfer this request to the management node, which will then direct it to the appropriate node, and the value will be returned in the reverse direction.

Each specific module, SM1, SM2, . . . , SMn, documents its predefined part by offering default lists for the selection of parameters to be measured (for example, parameter identifier, description of the measurement, period, storage or non-storage of the values in a "trace" file TF, display or non-display of the values), of conditions to be evaluated on its parameters and of associated actions to be initiated. A parameter can also be a piece of information on the status of an object (OK, which in the preceding example corresponds to a green icon, warning or alert, which corresponds to an orange icon, and alarm or down, which corresponds to a red icon) or a measurement such as, for example, "the number of transactions per second". If a parameter condition is true, an action is initiated and the fact that an action has been initiated is noted in an action log file (action, level, date, parameter identifier, object identifier, node, etc.).

During the configuration of the monitoring, the user of the management node describes the objects to be monitored [systems (UNIX, etc.), applications (Tuxedo, etc.), instances (Oracle, etc.), server (Informix, etc.), etc.] and specifies modifications relative to the default choice of the specific modules (for example, modification of the measurement period of a parameter, suppression of a parameter, addition of a parameter or a condition). For each new parameter to be measured, he describes the measurement command, indicates whether or not he desires to have the measurement displayed (in the form of a curve), specifies the conditions which will trigger an action (a sequence of operations) The action can consist of displaying the "down" status of an object (an Oracle instance, for example) using a function supplied by the product or of performing a test for correlation with a piece of system information (cpu utilization rate, for example) or Tuxedo information or information defined by the user.

Once the monitoring is configured, it can be activated. The configuration cannot be modified during a monitoring, and for this reason it is necessary to stop the monitoring first in order to modify the configuration and then to restart the monitoring in all of the agents.

When the monitoring is activated in each node to be monitored, the basic principal is that the "monitor" in each node does not dialogue with the management node except to display the status of an object or the curve of a parameter, or to notify the administrator. The actions are either local, that is internal to the node, or they request a service (essentially a display service) in the management node.

Also, one of the basic functions presented with the present process is provided for the purpose of collecting (in the management node) the log files SL of the parameters as well as the log files of the actions of each node monitored, for the independent analysis performed by the management node.

Thus, the administrator configures the monitoring by writing line commands directly into the configuration file. However, according to a variant, it is possible to use a graphical configuration tool which will generate the configuration file. An example of a line command syntax for specifying the objects and the parameters is offered below.

A # at the start of a line indicates a comment line, which makes it possible to invalidate a command without deleting it or to annotate the file.

The following is a non-limiting example of a configuration file specification which the administrator would be able to perform in order to describe objects he wishes to monitor, to modify the predefined operation of the agent (and of specific modules) and/or to create new parameters and conditions.

==>MAX_CPU percent of total cpu:

indicates the maximum cpu time allocated for the autonomous agent (generic agent and specific modules) in a node. If the maximum is reached, the modules modify the frequency of the parameter measurement and/or give priority to certain operations.

==>PERIOD seconds;

specifies the minimum time interval between two measurements of a parameter. This global value can be modified as necessary for a parameter or a condition.

```
==> OBJECT object_ident,
    [NODE = node] [BACKUP_NODE = backup_node]
    DESC = (
    SYSTEM, UNIX_ADMIN_USER=<unix_user>, GIBUS_ROOT=<ism_root>
    !TUXEDO, {V1CONFIG=<config_path>
        !TUXCONFIG=<tuxconfig>TUXDIR=<tuxdir>,
        APPDIR=<appdir>,
LANG=<lang>, UNIX_ADMIN_USER=<unix_user>,
        LIBPATH=<libpath>, QMCONFIG=<qmconfig>
        }
    !ORACLE,  {V1CONFIG=<config_path>
        !ORACLE_SID=<sid>, ORACLE_HOME=<oracle_home>,
        UNIX_ADMIN_USER=<unix_user>, ORACLE_USER=<user>,
        ORACLE_PASSWORD=<password>,
        CONNECT_STRING=<connect_string>, TNS_ADMIN
            =<tns_admin>,
        }
    !INFORMIX, INFORMIXSERVER=<informixserver>, INFORMIXDIR=
        <informixdir>,
        ONCONFIG=<onconfig>, UNIX_ADMIN_USER
            =<unix_user>,
    !SYBASE, SYBASE=M<sybdir>, DSQUERY=<servername>,
        UNIX_ADMIN_USER=<unix_user>, SYBASE_USER
            =<user>,
        SYBASE_PASSWORD=<password>,
    !XCP2POOL, CONFDIR=<confdir>, UNIX_ADMIN_USER
        =<unix_user>
    !GLOBAL.UNIX_ADMIN_USER=<unix_user>,
        COMPONENTS=((object_ident, father_sev), . . . )
    }
[obj_display_clause]
    [SCANLOG=([LOGFILE=(logpathname, [logpathname] . . . )]
        [ERROR_CONTROL=error_control-file]
``` defines an object "system" (a UNIX system handled by the specific module "System" which measures the cpu utilization rate, the number of inputs/outputs per second, etc.) or an object "Tuxedo application", or an object "Oracle instance", etc., or an object "global_object" composed of an Oracle instance and a Tuxedo application, for example.

The user chooses (by means of the interface GUI) the list of objects to be viewed (their icon), in the main window of the interface GUI. An object in this list that is not selected will only be viewed if a "zoom" is performed on a global object which contains it. A global object can also be labelled as a component (COMPONENTS) of a global object and is a component of a global object [GLOBAL (a particular Oracle instance is chosen from the list of objects to be viewed in the main window, since the users write SQL directly to the base)] since this base is accessed by a given application. Several of the terms used above can be explained as follows:

NODE: For a SYSTEM object, NODE is the name of the node. For an Oracle instance, NODE is the node in which the instance is located. For a Tuxedo application, NODE is the "master node". For a global application, if no parameter has been created for this object, no NODE is mentioned, and if parameters have been created for this object, a NODE must be mentioned and the measurement must be executed (the condition will be evaluated and the action initiated) in the node specified by NODE.

BACKUP_NODE is the name of the node in which the object (the Tuxedo "master node", the Oracle instance, etc.) will run in case the application is switched to another node, for reasons of operation or due to a stop, for example a failure, of the original node. This information is used to quick start the monitoring of the object in the backup node.

ORACLE: This is the type of the object described. ORACLE_SID is the name of the instance. When a user is connected to an Oracle base, he writes <oracle_user>/<oracle_password>@<connect_string>. UNIX_ADMIN_USER is a name of a UNIX user which will be used by the monitoring process, from the management node, to execute operations on the Oracle base located in the node to be monitored.

COMPONENTS: The object identifier (object_ident) of all the son objects is given and for each of the sons the color (OK [green], WARNING [orange], DOWN [red]) inherited by the father is given if the son has the color red (DOWN). DOWN is the default value of "father_sev".

SCANLOG: for each object the administrator can designate the "log" files SL to be scanned and the "critical" errors to be searched for. If the option SCANLOG does not exist, nothing is done in the "log" files. If the "log" file LOGFILE is not described (the files to be scanned are not specified), each specific module has a predefined rule for constructing the list of files to be scanned. The file error_control_file describes the errors to be searched for in the "log" files and associates an action class identifier (character string) with each error: if the error is found, the action specified is called by giving it the associated action class, which is used to branch to the correct operation. For example "ORA-0600: 2 ACT_RESTART" means that if the error "ORA-0600" is found in the file alert_<sid>.log., then an action (predefined by the specific module or supplied by the administrator by modifying, using MODIF_COND_PARAM, the predefined parameter ORA_PARAM_LOG) is called by sending as an argument the class ACT_RESTART, as well as "the object_id", etc. If "ERROR_CONTROL" is not described, the file predefined by each specific module is used. If one of the errors mentioned in the file "error_control_file" appears, a predefined action or an action defined by the user is activated.

```
    SCANLOG=() means to take into account the "log" files, the
"error_control_file" and the default action.
==> MODIF_PARAM param_indent
    {[IGNORE]
    |[TRACE ! NOTRACE] [PERIOD=seconds] [NB_VALUES=n]
    [param_display_clause]
    };
```

"param_ident" is the identifier of the parameter. For the parameters predefined by the specific modules, "param_ident" is a described keyword: the user can modify certain attributes of this predefined parameter (period, "trace", display, the condition) or suppress it but he cannot change the command. The information to be obtained is either a status indicator of an object (0 if "OK" [green], 1 if "warning" [orange], 2 if "down" [red], for example) or a measurement (metric) of an object.

TRACE: the measurement is stored in a "trace" file TF, for autonomous analysis.

PERIOD is the collect time.

IGNORE: the administrator does not want this parameter to be measured periodically. By default, each specific module will regularly measure a certain number of parameters (metric and health indicators). These parameters are described. Each parameter that is measured is identified in a unique way for an object type. Example: "Ora_Active_Transactions". It is possible, in a condition or in an action, to request a real-time, non-periodic measurement of a parameter which has the option IGNORE (see the basic function "GetOnlineValue").

NB_VALUES: by default, each predefined parameter could have a maximum number of values stored in a result table. This predefined number is specific to each parameter: it depends on predefined functions such as "get_last_value," "get_delta", "get_average(20)" which request the last value or the last n values of the parameter. This predefined number is therefore consistent with the predefined conditions and actions. If the administrator adds external conditions or actions which request a greater number of last values, it modifies the number by "NB_VALUES" (the new value must be greater than the predefined value, otherwise there is a warning ("warning") and the number of values is not modified).

```
==>    MODIF_COND_PARAM    object_ident   param_indent,
condition_rangr_number
    {[IGNORE]
    |[CONDITION = param_condition]
        [ACTION= (UNIX_FILE, 'unix_file [args]'
            !UNIX_COMMAND, 'unix_immediate_cmd'
            !SPECIF_FILE, 'command_file [args]'
            !SPECIF_COMMAND, 'specific_immediate_command'
        ]
    };
``` the parameters, the conditions and the actions are completely predefined; the identifier "param_ident" of each parameter and therefore the condition which will be processed, as well as its period are described.

It is possible to modify a predefined single condition associated with a parameter and identified by the identifier "param_ident" of the parameter and the number of the condition (1, 2 or 3). When desiring to modify the period, it is necessary to pass through "MODIF_PARAM" of the identifier "param_ident". The administrator can customize by modifying the entire condition or the threshold (and its hysteresis or the value of "DURING" depending on the condition "param_condition") or the range of values of a condition, or suppress ("IGNORE") the processing of this condition, or supply his own action to be executed if the condition is true. For "UNIX_FILE", "UNIX_COMMAND", "SPECIF_FILE" and "SPECIF_COMMAND", see "CREATE_PARAM" below. Each specific module documents its predefined parameters, particularly its condition: test of the result of the measurement relative to a threshold, or relative to a threshold during n seconds, or relative to a range ("RANGE").

```
==> MODIF_COND_MULTIPLE cond_ident
    {[IGNORE]
    |[ACTION=UNIX_FILE, 'unix_file [args]'
     !UNIX_COMMAND, 'unix_immediate_cmd'])
    [PERIOD=seconds]
    };
``` makes it possible to modify a predefined multiple condition identified and documented under the name "cond_ident". The thresholds of a multiple condition cannot be modified: the administrator can delete the predefined multiple condition and create a new one in which he places the thresholds he desires.

```
==> CR_PARAM object_ident, param_ident
    MEASURE= (SPECIF_FILE, 'command_file [args]'
        !SPECIF_COMMAND, 'specific_immediate_command'
        !UNIX_FILE, 'unix_file [args]'
        !UNIX_COMMAND, 'unix_immediate_cmd'
    [ARG_REQ]
        [STATE | METRICS] [RESULT_TYPE={INT | FLOAT}]
[PERIOD=seconds]
    [NB_VALUES=n] [TRACE]) [param_display_clause]
    [CONDITION1] = (param_condition
    ACTION= (UNIX_FILE, 'unix_file[args]'
        !UNIX_COMMAND, 'unix_immediate_command'
        !SPECIF_FILE, 'command_file [args]'
        !SPECIF_COMMAND, 'specific_immediate_command'
        )
    )]
    [CONDITION2=( . . . )]
    [CONDITION3=( . . . )]
```

The administrator can create his own parameters and associate them with a command ("MEASURE=").

SPECIF_FILE: if the object is Oracle, it is written in SqlPlus in the SQL file. Authorized for objects of the Oracle, Informix, and Sybase types. The execution is started on behalf of the user "ORACLE_USER" (for Oracle) specified in the object.

SPECIF_COMMAND: if the object is Oracle, it is written in Dynamic Sql in this SQL command. Authorized for objects of the Oracle type. The execution is started on behalf of the user "ORACLE_USER" specified in the object. Maximum length of the command: 512.

UNIX_FILE and UNIX_COMMAND: the UNIX command is executed. Authorized for all objects. The execution is started on behalf of the user "UNIX_ADMIN_USER" specified in the object. In the case of "UNIX_FILE", the file "unix_file" is downloaded (at the start of the monitoring process) into the node associated with the object labelled by "object_ident". For "UNIX_COMMAND", there is no downloading: the command is transported by the parameter.

If "object_ident" is an object "GLOBAL", the command is executed in the node indicated by "OBJECT . . . NODE= node . . . "

STATE or METRICS: a parameter is either a status parameter (it represents the proper functioning of an object) or a metric (the number of transactions per second, for example). If "STATE", after the processing of the measurement, the function for displaying the status of the object (green/orange/red icon) is called if the status has changed since the last measurement.

RESULT_TYPE: "INT" (integer) or "FLOAT" (for a percentage, for example).

CONDITION: if the user creates a parameter and specifies a single condition, he writes it "on the fly". The condition is evaluated "on the fly" with the measurement and not independently from the moment in which the measurement is performed.

ACTION: the complete name of a shell or binary program is specified, possibly followed by parameters ("UNIX_FILE") or a UNIX command ("UNIX_COMMAND") or by an SQL file ("SPECIF_FILE" ) or an SQL command ("SPECIF_COMMAND"). An example is "ACTION= (UNIX_FILE, 'all_actions_binary action_1')": the administrator supplies a single program for all the actions. This program branches according to the first parameter, which is the name of a particular action. The monitoring process will call this program with all the parameters stored in "unix_file [args]" and will add parameters which represent the context, such as the identifier "object_ident", the identifier "param_ident", and the value of the parameter (see basic functions below).

ARG_REQ: this option is used if the measurement requires an argument which will be supplied later in "single_condition" in "GetOnlineValue". Makes it possible to perform a check on the reference in "single_condition." For example: "GetOnlineValue (or714.ORA_TS_FREE_PERCENT, TABLESPACE_1)" gives the available percentage of the table space "TABLESPACE_1".

```
==> CREATE_COND (single_condition [AND/OR
   single_condition]
...) ACTION=UNIX_FILE, "unix_file [args] [PERIOD=N];
``` for a condition created by the user, it specifies the period and the action. Possibly placed in parentheses for the resolution of single conditions ("single_conditions"). The condition is evaluated by the generic agent GA' in the management node. The action is initiated in the management node (the file "unix_file" is therefore located in this node).

```
==>obj_display_clause:
   DISPLAY= ([GRAPH=(graph) ident TITLE=" ... "
   [TYPE=curve ! pie !
histogram] [MIN=min_value, MAX=max_value]) [GRAPH=
(graph_ident ... )]
... ])
```

GRAPH: the administrator associates parameter graphs with an object. "TITLE" is the name of the graph.

TYPE for a curve, pie graph, or histogram: when parameters are displayed in a graph of the "curve" type, it is necessary to give the value min and the value max in order to represent the ordinate (it being known that the abscissa is the date of the measurement of the parameter). The default value is 0.100 as in a percentage. The icon is green/orange/red depending on its status ("OK", "WARNING", "DOWN").

```
==> param_display_clause : DISPLAY=("param_title", [GRAPH=
(graph_ident [graph_ident] ... ))
```

By default, no parameter is displayed. "param_title" is the name of the parameter. GRAPH: specifies in which graphs the parameter is found. Several parameters can belong to the same graph if it is desirable to view them together.

Also by default, in each object type (Oracle, Tuxedo, system, etc.) a certain number of status checks are done. If one of these checks is negative, it results in the triggering of an action and the icon of the object in question (Oracle instance, Tuxedo application, etc.) will change its status (and thus its color) on the management screen.

Examples of conditions attached to a parameter are given below. The character # means "object_ident.param_ident". It is not necessary to specify "object_ident.param_ident" since it is the current parameter.

```
param_condition::=
(
{#
|GetLastValue (#)
|GetDelta (#)
|GetAverage (#, nval)
|GetPercentRangeChange (#, min, max, init_value)
|GetPercentLastChange (#, init_value)
}
{operator value1 [HYSTERESIS=value2]
| IN (min_val, max_val)
)
or (# operator value1 DURING=nsec)
``` or GetLastValue (#): the last value measured. It is the default function if no function "objid.paramid" is specified.

GetDelta (#): delta, in absolute value, between the last two values.

GetAverage (#, nval): average of the nval last values of the parameter, no average of more than 20 values.

GetPercentRangeChange (#, min, max, init_value): change relative to a range of values (val2−val1)/(max−min).

GetPercentLastChange (#, init_value): change relative to the preceding value: (val2−val1)/val1.

operator: <, <=, >, >=, ==, != value1: threshold

HYSTERESIS=value2=>the condition is only true if the value of the parameter has previously fallen below "value2" then re-reached the threshold "value1". In order not to take action in bursts. By default, the hysteresis has the value of the threshold ("value1").

DURING=nsec: is the value of the parameter "operator" (greater, for example) than the threshold during a given time "nsec"? The basic function transforms the time "nsec" into a number "nval" of values, then tests whether the "nval" last values are all "greater" than the threshold". Returns 1 if true, 0 if not.

IN: Is the value measured within the range [min_val, max_val]?

Example:

```
CREATE_PARAM 02714_NEW_PAR or714_orage,
   MEASURE=(SPECIF_FILE, /x/y/z.sql TS1),
```

-continued

```
    PERIOD=1h, TRACE,
    CONDITION=((# > 34), ACTION= (UNIX_FILE, myprog act1 or
714));
    For the single condition:
single_condition::=
    (
    {object_ident, param_ident
    |GetLastValue (object_ident, param_ident)
    |GetDelta (object_ident, param_ident)
    |GetAverage (object_ident, param_ident, nval)
       |GetPercentRangeChange (object_ident, param_ident,
min, max, init_value)
       |GetPercentLastChange (object_ident, param_ident, init_value)
       |GetOnlineValue (object_ident, param_ident, [argument])
    }
    {operator value1 [HYSTERESIS=value2]
    | IN (min_val, max_val)}
    )
``` or (object_ident, param_ident operator value1 DURING=nsec)

GetLastValue (objid.paramid): the last value measured. This is the default function if no function "objid.paramid" is specified.

GetDelta (objid.paramid): delta, in absolute value, between the two last values.

GetAverage (objid.paramid, nval): average of the nval last values of the parameter, no average of more than 20 values.

GetPercentRangeChange (objid.paramid, min, max, init_value): change relative to a range of values: (val2−val1)/(max−min).

GetPercentLastChange (objid.paramid., init_value): change relative to the preceding value (val2−val1)/val1.

GetonlineValue (objid.paramid, argument): performs the real-time measurement rather than searching for the value of the parameter in the table of measurements already performed. The function "GetOnline" cannot be found in a condition attached to a parameter. It can only be in a multiple condition or in an action). The parameter "paramid" has been documented either as having accepting or not accepted an argument. See the option "ARG-REQ" of "CREATE_PARAM".

A multiple condition cannot contain more than ten single conditions.

Example:
CREATE_COND ((or714_orage.NB-COMMIT_PER_SEC<23) AND (GetAverage(syst.orage.CPU_BUSY, 10)<95)) ACTION=(UNIX_FILE, 'myprog new_server or714') PERIOD=1h;

Preferably, the process according to the invention is used as follows. The administrator describes the objects to be monitored: "OBJECT object_id", etc. He specifies the modifications to be made to the attributes of a predefined parameter for a given object "object_id":

to suppress a parameter: MODIF_PARAM param_id, object_id, IGNORE;

to change an attribute of the parameter: MODIF_PARAM param_id, object_id, TRACE, PERIOD= . . .

Then he specifies the modifications to be made to a condition of a predefined parameter for a given object "object_id";

to suppress a condition: MODIF_COND_PARAM cond_id, object_id, IGNORE;

to change all or part of a condition: MODIF_COND_PARAM, cond_id, object_id, CONDITION=(#>45); or MODIF_COND_PARAM cond_id, object_id, CONDITION=(#>95 DURING=30 sec), or MODIF_COND_PARAM cond_id, objet_id, CONDITION=(#IN (0.350));

to change the associated action: MODIF_COND_PARAM cond_id, object_id, ACTION=( . . . );

Next, he specifies the modifications to be made to a predefined (and documented) multiple condition:

to suppress a multiple condition" MODIF_COND_MULTIPLE cond_id, IGNORE;

to change the associated action: MODIF_COND_MULTIPLE cond_id, ACTION= . . . ;

to change the period of the condition: MODIF_COND_MULTIPLE cond_id, PERIOD=5 mn.

Also, he creates a new parameter to be measured in a given object:

parameter without condition, to be analyzed ("trace") CREATE_PARAM param_id, object_id, MEASURE=( . . . ), PERIOD=5 mn, TRACE, . . . ;

parameter with condition/action : CREATE_PARAM param_id, object_id, MEASURE=( . . . ), PERIOD=5 mn, CONDITION=((object_id, param_id>95) ACTION=(UNIX_FILE, 'myprog act1').

Finally, he creates a new (multiple or single) condition on (predefined or new) parameters: CREATE_COND ((obj1.param1>95) AND (obj2.param2>80 during 3 mn) ) ACTION=(UNIX_FILE, 'myprog act1') PERIOD=15 mn.

The actions on condition can be explained as follows. An action is triggered if:

a condition on one or more (status or metric) parameters is true, a multiple condition is true, a critical error appears in a "log" or "trace" file.

For an action of a condition attached to a parameter, the parameters sent to the action are: "object_ident", "param_ident", "condition_number", "param_value", "threshold", "operator", "object_specif_string".

For an action of a multiple condition, the parameters sent to the action are: "cond_ident".

The action can be predefined or supplied by the administrator. It can include:

a request to display the status ("ok", "down", "warning") of one or more "objects to be monitored" and the refreshing of the icon according to the status to be displayed. An "object to be monitored" is always displayed in the form of an icon.

an immediate predefined correction, with or without a tuning request via the interface GUI.

a predefined correction proposition, to be activated offline, a sending of a message to the administrator [interface GUI or history log of a product or knowledge base of an integrated systems management product, mail, audible signal ("beep"), etc.], a corrective action, completely described by the administrator. This can correspond to adding a Tuxedo server if the cpu utilization rate is no higher than x%, a correlation test on other data "ora/tux/syst", then if the latter is satisfied, action as above. Then requesting the value of another parameter ("last_value", average of n values," "delta", "online" value), opening, on the management screen, a dialogue with the administrator so that he specifies the actions to be taken. This makes it possible to react dynamically to specific problems. This must not be used systematically in the actions.

Some non-limiting exemplary embodiments of predefined Oracle parameters are offered below:

the parameter "ORA_USER_ACCESS", in which the measurement consists of making a connection attempt using the function "connect_string" supplied to the user; the condition corresponds to verifying whether the or not the attempt has succeeded, and the action resides in the analysis of the cause and in the possible restart.

the parameter "ORA_FREE_TS", in which the measurement consists of determining the percentage of free space relative to the size of the table space ("Tablespace"); the condition 1 is, if the measurement is <5%, initiate action1, which corresponds to creating a file in a file system ("FileSystem") used by the table space ("Tablespace"), while the condition2 is, if the measurement is <10%, send a warning message (WARNING) to the interface GUI (GUI/Events).

the parameter ORA_FRAGMENT_TS", in which the measurement consists of verifying the condition which corresponds to the case in which the largest of the extents ("MAX_EXTENTS") of the tables of the table space ("Tablespace") is smaller than the largest hole of the table space, and if this condition is true, of sending an action proposition window in which it is indicated that the table space ("Tablespace") must be reorganized according to the following propositions:
either a file is automatically created to enlarge the table space ("Tablespace"),
or it requests when a standard "export_operation_tables/import" command is to be executed,
or the administrator is requested to program the start of his reorganization utility.

the parameter "ORA_SCANLOG", in which the Oracle errors to be processed in the file "alert.log" are predefined. A predefined action class corresponds to each error. Example:

ORA-0603: ACT_RESTART1

ORA-1600: ACT_ARCHIVE_INCREASE, the measurement consisting of searching for the predefined errors in the file "alert.log", the condition being, if the error is found, call the predefined or external action linked to the action class of the error found (ACT_RESTART1=>restart the instance using startup).

Likewise, the following are non-limiting examples of basic functions. These basic functions can be used in the actions supplied by the administrator. The administrator cannot use functions which require more values than are possible for a parameter (see "NB_VALUES"). These basic functions are also used internally in the actions by the specific modules and the generic agent. See the paragraphs above related to conditions for some of the basic functions used in the conditions.

A basic function such as "GetLastValue" can request the value of a parameter related to an object monitored by another node.

These functions must be able to be called in a C program and in a "shell" program".

GetLastValue (object_ident, param_ident, &result_ant): returns the last measured value of a parameter.

GetAbsDelta (object_ident, param_ident, &result_nt): returns the value "difference between the last two values" of the parameter (in absolute value).

GetSignDelta (object_ident, param_ident, &result_int): returns the value "difference between the last two values" of the parameter (the value with its sign).

GetAverage (object_ident, param_ident, &result_int, nval): returns the average of the "nval" last values of a parameter. Limit: "nval" cannot be greater than 20, GetonlineValue (object_ident, param_ident, *result_nt, argument) : returns the value of the measurement in real time rather than searching for the value of the parameter in the table of the measurements already performed. The parameter "param_ident" has been documented as having accepted or not accepted an argument (see the option "ARG_REQ" of "CREATE_PARAM"). This function does nothing but perform the measurement, which means that if this parameter has conditions/actions, they are not evaluated. "GetOnlineValue" can be performed on a parameter (and an object) which has the option "IGNORE" (this means that the specific module has the description of the parameter, without the conditions/actions).

GetPercentRangeChange (object_ident, param_ident, &result_int, min, max, init_value): change relative to a range of values (val2−val1)/(max−min). Val2 is the measured value; "val1:: is the preceding measurement.

GetPercentLastChange (object_ident, param_ident, &result_int, init_value): change relative to the preceding value (val2−val1)/val1.

SetVarString (object_ident, variable_name, string_value): to set a value in a variable defined by the user. This variable will be used in the function "GetVar" for learning the value. This mechanism can be used to transmit information between a measurement and an action, between two measurements, between two actions. The range of a variable is the object identifier ("object_ident"). The variables are chained to a specific object. The user cannot perform "SetVarString" on a variable whose name begins with |_, in order to protect the variables allocated by a specific module.

SetVarInt (object_ident, variable_name, int_value): same thing as for "SetVarString", except the value is an integer ("int").

GetVarString (object_ident, variable_name, &string_ptr): returns a pointer (in "string_ptr") on the value of the variable.

GetVarInt (object_ident, variable_name, &int_value): returns an integer which is the value of the variable.

GetCurrentObjectId (): returns the object identifier ("object_ident") of the current object processed by the specific module in the action. Makes it possible, in an action, to test the value of another parameter of the same object using "GetLastValue(GetCurrentObjectId (),ORA_COMMITS)".

GetLocalNodeObjectId (): returns the object identifier ("object_ident") of the system object of the local node. Makes it possible in an action to test the value of the cpu utilization rate in the local node using the following functions:

"GetLastValue(GetLocalNodeobjectId(), SYST_CPU_BUSY)".

TestDuring (object_ident, param_ident, time, operator, threshold): returns the true (1) or false (0) value of the condition: is the value of the parameter "operator", greater for example than the threshold during a given time? The basic function transforms the time into a number n of values then tests whether the n last values are all "greater" than the threshold.

Trace (object_ident, param_ident, type_value, param_value) to place the measurement of a parameter in the "trace, file for independent analysis (file name: "appl_survey,<node>,<dateofday>, params.trc"). The basic function adds the name of the machine the date/time. Type_value is an integer: 1 (int) or 2 (float).

StopObjSurvey (object_ident): the generic agent sends this function to the interface GUI so that it displays the status of the object with an icon. The generic agent first sets the field "survey_status" to 1 (stop) for the object. The field "survey_status" can be : 0 (object being monitored), 1 (object no longer being monitored), 2 (object whose monitoring must be started by: "start_survey"), 3 (object whose parameters are not processed)

DisplayGraph (object_ident, param_ident, param_type, param_value) : to display the value of the parameter by means of the interface GUI. The basic function also sends the date/time.

DisplayState (object_ident, param_ident, objtype, severity_level, msg, line1val, line2val): to return the status of an object so that the interface GUI displays it. The interface GUI modifies the status of the icon associated with the object. "Objtype" is, for example, ORACLE, SYSTEM, TUXEDO, etc. "Msg" is detailed information on the status of the object: via the "button2" (middle), the interface GUI displays this information. The display action takes place on the management machine. "Line1val" and "line2val" (lines under the icon) are the values of the two lines: "NULL" means not to display the line under the icon.

DisplayStateInternalSon (object_ident, internal_objid, param_ident, internal_objtype, father_sev_level, internal_sev_level, msg, lineqval, line2val) : to return the status of an object so that the interface GUI displays it. The interface GUI modifies the status of the icon associated with the object. "Internal_objtype" is, for example, "TUX_MASTER", "TUX_NODE", it "TUX_QUEUESPACE". "Msg" is detailed information on the status of the object: via the "button2" (middle), the interface GUI displays this information. The display action takes place on the management machine. "Line1val" and "line2val" (lines under the icon) are the values of the two lines: "NULL" means not to display the line under the icon.

RemoveInternalSon (object_ident): to inform the interface GUI that since the father object is "DOWN" (malfunctioning), it is not possible to access the internal sons. Thus, the icons associated with the internal son objects must no longer be viewed.

SendHisto (severity, object_type, message, ack_required) : to return a message in the history log of a product; "object_type" identifies the specific module (oracle, tuxedo, system, etc.).

SendIsmAlarm (severity, object_type, message, ack_required) to return an alarm to the alarm of an integrated systems management product; "object_type" identifies the specific module (Oracle, Tuxedo, system, etc.). Severity to be specified.

SendMsg (severity, object_type, message, ack_required): if "severity" is W or I: "SendHisto". If "severity" is A or E and if an integrated systems management product is present as a "super manager", then "SendIsmAlarm"; if not "SendHisto". If ack_required=1": a flag icon (integrated systems management product or history log of a product) appears indicating that there is a message to be acknowledged in the alarm of the integrated systems management product or in the history log of a product.

DisplayMessage (message): to display on the management machine a window containing the message and a button "OK" for deleting the window.

AskForCommand (message, response): to display on the management machine a window containing the message requesting whether the administrator agrees for this command to be executed. Returns the response (1: yes, 0: no) to the question. Depending on the response, to execute or not to execute the command. If no response is received after a predetermined delay, the command is not executed.

"warn admin" ("mail", "beep", msg console", etc.)

The following are various exemplary configurations to provide a clear understanding of the process:

```
OBJECT or 716_orage, NODE=orage,
DESC=(ORACLE, ORACLE_SID=or716, ORACLE_HOME=/ora716,
UNIX_ADMIN_USER=ora716, ORACLE_USER=sys,
ORACLE_PASSWORD=change_on_install,
CONNECT_STRING=P:or716, TNS_ADMIN=/ora716/network/admin)
DISPLAY=(GRAPH=(graph_or716, TITLE=or716graph));
``` to modify the period of a check (measurement of the status parameter "ORA_CONNECT_STATUS" predefined by the specific Oracle module and documented):

```
MODIF_PARAM or716_orage, ORA_DB_ACCESS,
    PERIOD=1 h;
``` to replace in the condition the value of the free space threshold:

```
MODIF_COND_PARAM or716_orage, ORA_TS_FREE_
    TOOLS, 1, CONDITION=(#<15);
``` to create a new parameter with a condition/action:

```
CREATE_PARAM or716_orage,
USER_TS_SYSTEM_BLOCKS,
MEASURE=(SPECIF_FILE, /x/y/z.sq1)
[TRACE], PERIOD=12h, CONDITION=((# > 320) ACTION=
(UNIX_FILE,
'/x/y/all_actions.sh act_ts_system_blocks'));
``` to replace the predefined action, which was to send a message to the history log of a product, by supplying another action which consists of posting in the "crontab the execution of an Oracle utility on the overly fragmented table spaces ("tablespaces"):

```
MODIF_COND_PARAM or716_orage,
ORA_ALL_TS_FRAGMENT,
ACTION=(UNIX_FILE, '/oracle/action)_ora action_name');
``` to suppress the processing of a predef med parameter;

```
MODIF_PARAM or716_orage, ORA_TS_FREE_SYSTEM,
    IGNORE;
``` to modify the default options of the processing of a predefined parameter:

```
MODIF_PARAM or716_orage, ORA_TS_FREE_SYSTEM, TRACE,
    DISPLAY=(TS minfree, GRAPH=(graph_or716));;
```

The second example relates to the Tuxedo/Oracle/System global object.

to describe a global object (for example "flowbus_appli") constituted by an application "Tuxedo tux_demo_fb" (the "master node" of which is orage) which uses a base "Oracle or714_orage" and runs in the node "syst_orage". A graph of measurement curves is associated with each object. The objects (their icon) "tux_demo_fb" and "or714_orage" are only displayed if the user requests a zoom after having clicked on the global object ("flowbus_appli");

```
    OBJECT syst_orage, NODE=orage,
        DESC=(SYSTEM)
        DISPLAY=(GRAPH=graph_orage, TITLE=orage perfs);
    OBJECT tux_demo_fb, NODE=orage
        DESC=(TUXEDO,
        TUXCONFIG=/flowbus/val/test/marcel_demo/bin/TUXCON-
        FIG, TUXDIR=//usr/tuxedo,
APPDIR=/flowbus/val/test/marcel_demo/bin,
        UBBFILE=/flowbus/val/test/marcel_demo/bin/UBBCONFIG,
        LANG=C, UNIX_ADMIN_USER=fb_user,
        QMCONFIG=/flowbus/val/test/marcel_demo/bin/QUE,
        LIBPATH=/flowbus/val/test/marcel_demo/bin:/usr/tuxedo/
        lib:/flowbus/install/lib:/:/lib:/usr/lib:/user/lib/
        cobol/coblib),
    DISPLAY=(GRAPH=graph_tux_demo_fb,
    TITLE=tuxedo demo_fb
stats);
    OBJECT or 714_orage, NODE=orage
        DESC=(ORACLE, ORACLE_SID=or714,
        ORACLE_HOME=/ora714, UNIX_ADMIN_USER=ora714,
        ORACLE_USER=sys,
ORACLE_PASSWORD=change_on_install,
        CONNECT_STRING=ior714,
TNS_ADMIN=/ora714/network/admin)
        DISPLAY=(GRAPH=graph_or714, TITLE=or714 perfs);
OBJECT flowbus_appli,
        DESC=(GLOBAL_OBJECT, COMPONENTS=((syst_orage,
        DOWN), (tux_demo_fb, DOWN), (or714_orage,
        WARNING)),
        DISPLAY=(GRAPH=graph_flowbus_a, TITLE=global
        flowbus_a
            perfs);
``` to create a new number-of-messages parameter in the queue Q1 without condition/action:

```
CREATE_PARAM tux_demo_fb, Q1_MSG_NB,
MEASURE=(UNIX_FILE
    /x/y get_lg Q1)
    [TRACE], PERIOD=60s, DISPLAY=(number of messages in Q1,
    GRAPH=(graph_tux_demo_fb);
- to display parameters in measurement graphs;
MODIF_PARAM syst_orage, SYST_CPU_BUSY, DISPLAY=(cpu
busy,
    GRAPH=(graph_flowbus_a, graph_orage));
MODIF_PARAM syst_orage, SYST_IO_HDISK0, DISPLAY=(hdisk0:
    KB/sec, GRAPH=(graph_flowbus_a, graph_orage));
MODIF_PARAM or714_orage, ORA_SRV_NB, DISPLAY=(number
of
    dedicated Oracle servers, GRAPH=(graph_flowbus_a,
    graph_or714));
```

```
MODIF_PARAM or714_orage, ORA_COMMIT_PER_SEC,
    DISPLAY=(number of commits/sec, GRAPH=(graph_or714));
MODIF_PARAM tux_demo_fb, TUX_TPS, DISPLAY=(number of
    services/sec, GRAPH=(graph_flowbus_a, graph_tux_demo_fb));
MODIF_PARAM tux_demo_fb, TUX_CLIENT_NB, DISPLAY=
(number of
Tuxedo clients, GRAPH=(graph_flowbus_a, graph_tux_demo_fb)):
MODIF_PARAM tux_demo_fb, TUX_SERVER_NB, DISPLAY=
(number of
Tuxedo servers, GRAPH=(graph_flowbus_a, graph_tux_demo_fb));
```

The following graphs will be displayed if the "button" 3 of the objects is clicked:

```
Graph "graph_flowbus_a": "click" on "object flowbus_appli"
    cpu busy
    hdisk0: KB/sec
    number of dedicated Oracle servers
    number of services/sec
    number of Tuxedo clients
    number of Tuxedo servers
Graph "graph_orage": click on "object syst_orage:
    cpu busy
    hdisk0: KB/sec
Graph "graph_tux_demo_fb": "click" on "object tux_demo_fb"
    number of messages in Q1
    number of services/sec
    number of Tuxedo clients
    number of Tuxedo servers
Graph "graph_or714": "click" on "object or 714_orage"
    number of dedicated Oracle servers
    number of commits/sec
The third example relates to FSX.
OBJECT fs_oracle_orage NODE=orage DESC=(FILESYSTEM,
NAME="/oracle", MIN_FREE=20, MAXSIZE=300MB,
INCRSIZE=1MB);
``` to modify the period of the check (measurement of the parameter "FS_FREE_SPACE")

```
    MODIFY_PARAM fs_oracle_orage, FS_FREE_SPACE,
        PERIOD-1 h;
``` to replace the predefined action, which is to enlarge the file system to the maximum size, by supplying another action which consists of testing whether the "log" file is growing abnormally, and in that case, of seeing if the "trace" level is correct, and if it is not the "trace" level which is not appropriate, then . . . :

```
MODIF_COND_PARAM fs_oracle_orage, FS_FREE_SPACE,
    ACTION=(UNIX_FILE, '/oracle/action_fs_action_name'):
- to replace the value of the threshold "minfree":
MODIFY_COND_PARAM fs_oracle_orage, FS_FREE_SPACE,
    CONDITION=(# < 15 HYSTERESIS=18);
```

Occurring offline, the collection of the parameters takes place in a file "paramlog" in each node monitored. The actions are recorded in a file "actionlog" in each node monitored, particularly in order to:

allow the management of archives over a longer or shorter period, the display of past activities, the statistical relationships (over a day/week/month/year and various zooms on the information "system"/DB/TP/ EpochBackup/ . . . "). To allow statistics by Tuxedo application, by data base instance, by application X or Y, by "machine/cluster". To allow the collection/analysis of information to verify that the tuning ("tuning", SGA, etc.) is always correct (via a call to "DbaExpert" or the like). To store the recommendations.

The autonomous agent according to the idea of the invention is chiefly composed of a generic agent and of a plurality of modules specific to each type of object: Oracle, Tuxedo, system, DPG, FSX, SAP, etc. The global operation consists of measuring parameters, if necessary storing them in a "trace" file and allowing their display through the interface GUI, of evaluating the single or multiple conditions and of executing the action linked to the true condition, for all the objects described in the configuration file.

The generic "management" agent (in the management node) manages the following input data:

on the one hand, all the data which have been predefined by each specific module, for all the objects of the same type:
  parameters with their attributes (measurement period, trace/display with its period). Each parameter has a parameter identifier. The administrator can modify attributes of this parameter.
  possibly a single condition associated with a parameter on a multiple condition on several parameters, as well as the action linked to the condition. A single or multiple condition is identified (an identifier of the parameter for a condition linked to a parameter or a condition identifier for a multiple condition); the administrator can modify attributes of this condition.

on the other hand, the data which have been specified by the administrator:
  modifications on the predefined attributes: "trace", period, display, the data for a particular object or the suppression of a parameter.
  modifications on the predefined conditions: to change the threshold of a single condition, the action, the period, or to suppress the condition.
  creations of parameters with a possible single condition.
  creations of single or multiple conditions with an associated action.

The operation of the generic management agent occurs in the following way:
  reading of its configuration file. Syntactic and semantic analysis ("MODIF_PARAM" of a non-existent parameter, etc.)
  merging of the configuration file supplied by the administrator and the configuration file supplied by the specific modules.
  sending of the resulting configuration file to each agent (filtering relative to the objects to be monitored in the machine and taking into account the problems inherent to the malfunctioning nodes or to the nodes provided for backing up the data of a malfunctioning node in another node).

The operation of the generic agent of a node other than the management node occurs in the following way:
  reading of the configuration file; only the objects local to this node are processed.
  construction of the object table ("OBJECTS").
  construction of the parameter configuration table ("CONFIG_PARAM").
  construction of the parameter value table ("PARAM_VALUES").
    each parameter of each object has at least one place for storing its value or values. If there are functions such as average ("paramid", 20) or execution time, then the number of places to be reserved for this parameter of this object is calculated.
  construction of the multiple conditions table ("COND_MULTIPLE").
  supplying of the basic functions for the use of the specific modules for some and for the external actions for others.
  starting of the specific modules:
    the "heavy" specific modules like Oracle, Informix, Tuxedo, each have their own operation. Others, like FSX, DPF can be grouped into a single operation. The purpose is not to serialize all the monitoring processes but to execute a certain number of is them in parallel. The global object must not consume more than the maximum cpu ("MAX_CPU") authorized.
    to start only the modules which have an object to monitor.
  configuration from the file monitoring service, for example RSF ("Remote System Facility"), so as to allow the process of the scanning of the log files ("logs") of all the objects described.
  evaluation of each multiple condition, with its period:
    to search for the values of the parameters in the parameter value table ("PARAM_VALUES") or via the function "get_online".
    if the multiple condition is true: to execute the {internal or external) action.
  regular verification of the proper functioning of the specific modules (sending of a special parameter and wait for the response).

In addition to the basic functions provided on the outside, the generic agent and the specific modules use the following basic internal functions:

PutValue (object_ident, param_ident, param_value_: to store in the table "PARAM_VALUES" the last value of a given parameter of a given object. This function is used by the specific modules after the measurement of the parameter.

ExecMeasure (param_entry) : see "processing of a parameter".

ProcessHysteresis (object_ident, param_ident, param_value) if the field "action" is not enabled ("ACTION_SWITCH OFF") then compare "param value" with the hysteresis. If less (an operator inverse to the one for the threshold) enable this field ("ACTION_SWITCH ON"), otherwise disable it ("ACTION_SWITCH OFF"). "ACTION_SWITCH" is a field of the condition structure and is initialized at "ON." If "ACTION_SWITCH" is set to "ON" for a condition, the same must be done for the higher conditions, that is conditions 2 and 3 if "ACTION SWITCH" is set to "ON" for condition 1.

EvalConds (param_entry) loops onto the conditions of a parameter and calls "EvalCond" (see "processing of a parameter"). This function makes it possible to test the field "action_switch" of the parameter entry before initiating the action.

EvalCond (cond_entry) evaluates (true/false) a condition.

ActionCondParam (object_ident, param_ident, condition_number, param_value, condition_buffer, object_specif_string) and ActionCondMultiple (action_name, action_type, cond_ident): these functions make it possible to start an action. If "action_ type" is internal ("internal", predefined by the specific module) then call an entry point internal to the specific module by passing it the arguments "object_ident", etc. If "action_type" is external ("external", supplied by the administrator) and if a specific file ("SPECIF_FILE") is involved, call one entry point of the specific module which processes the command file, but if a specific command ("SPECIF_COMMAND") is involved, call another entry point of the specific module which processes the command. In the case where a UNIX file or a UNIX command ("UNIX_FILE", or "UNIX_COMMAND") is involved, open the synchronization file, also called a "pipe" by one skilled in the art, (using the command "popen" which is a contraction of "pipe open") in the string entered, adding as arguments whatever makes it possible to characterize the context: "object_id,", "param_id", etc. The basic function records the fact that this action has been executed in the file "actionlog" of the local node: the name of the file is "actionlog appl_survey.<node>.<dateofday>. actions.trc".

These basic functions are used by the specific modules and must be able to be called in a C program.

The operation of a specific module (Unix system, mail, FSX, DPF [Distributed Print Facility], Oracle [database], Informix [UNIX database system], Tuxedo [application], FlowBus [interapplication flow manager], XCP2 [extended Cooperative Protocol level 2], SAP [Service Access Point], etc.) occurs in the following way:

scanning of the parameter configuration table ("CONFIG_PARAM"), processing only its own objects:
  parameters already sorted in increasing period order.
  for each parameter of each object, according to the period:
    perform the measurement using the internal command (predefined parameter) or the external command ("CREATE_PARAM"), placing it in the table "PARAM_VALUES".
    if a "trace" is performed, place the value in the global "trace" file of the autonomous agent (see basic functions).
    if a display is requested, display the value or the status.
    evaluate the single condition, if one exists, and execute the (internal or external) action if the condition is true.
processing of the unexpected requests ("get_online") for real time parameter measurements.
The processing of a parameter is carried out as follows:
if the parameter is valid and the period determined:

if param.valid_param_entry & param.period_OK then return_code=ExecMeasure (param_entry)

if a condition on a parameter exists and the parameter is valid:

if param.cond_exists & param.valid_param_entry & (return_code ==0)

then EvalConds (param_entry)

The content of the basic function "ExecMeasure" for performing the parameter measurement is more precisely explained below:

if param.measure_type="internal", then status=param.measure_cmd(param.param_ident,object_ident,& param_ value)
   if not, status=execute param.measure_cmd (shell or binary program)
      with the following as its argument: (param_ident, object_ident), execute by redirecting its output into a "pipe". Convention: the external program places its value in its standard output and the value of the parameter measured is retrieved by reading the file "pipe".
   if (status ==0), then
   PutValue (param.object_ident, param.param_ident, param_value)
   if param.trace, then Trace(param.object_ident, param.param_ident, param value)
   if param.param_display, then DisplayGraph (param.object_ident, param.param_ident, param_value)

The content of the basic function "EvalConds" for evaluating the conditions on the parameters is more precisely explained below:
   for i=1 to nbconds
   ProcessHysteresis (param.object_ident, param.param_ident, param.value)
   if ACTION SWITCH OFF==>next condition
   bool=EvalCond (param.cond_entry(i))
   if (bool==true) & (action_switch==ON), then
   {ActionCondParam (param.object_ident, param.param_ident, param.condition_number, param_value, param.cond_entry(i), object_specif_string)
   ACTION_SWITCH=OFF
   break
   }

The following are two code examples, the first of which relates to the code of the measurement command ("measure_cmd") of the specific module, particularly the specific module "FILESYSTEM" (FS);
   dispatch (param_ident)

```
FS_FREE_SPACE:
    call_measure param.name free_percent, currsize
    if measure KO ("name" not found or not returned) then
      SendHisto (AS, "Filesystem %param.name not found in
      %param.node machine")
      param.measure_rc=DOWN
      return −1
    if not *param_value = free_percent
    return.
```

The second example relates to the code "action of the specific module":
   dispatch (action_name)

```
FS_FREE_SPACE_ACT1:
    if (currsize < obj.maxsize) then
    if ((currsize + obj.incrsize) > obj.maxsize) then
      incr_t=obj.maxsize - currsize
    if not incr_t=obj.incrsize
    call chfs_command (name, incr_t)
    return.
```

At this stage of the description, several remarks must be made:
   the measurement sends the messages if a problem is encountered in this measurement.

if n conditions are imposed, only one action is executed, that of the first true condition ("cond1" then "cond2" then "cond3").

the following fields are to be provided in the entry "param":

measure_rc (OK,KO)

param_state (state, metric)

action_switch (ON, OFF): initialized to ON, set to OFF if the value of the parameter is lower (an operator inverse to the one for the threshold) than the hysteresis. By default, the hysteresis has the threshold value.

The field "action_sw" is tested in the basic function "EvalConditions".

a parameter "state" always has its last two values in the "result" table, at a given moment, access to an object entry and to a parameter entry is authorized.

when an agent operates remotely from the management node in order to monitor a plurality of nodes, it may be necessary to provide an SNMP manager which dialogues with the standard SNMP agents in the nodes involved. This remote agent manages the files "paramlog" and "actionlog" in the management node.

The processing of the actions occurs as follows:

the generic agent and the specific modules request to execute an action (predefined or supplied from the outside).

any action receives arguments which represent the context which triggers the action:

the object identifier (object_ident), the identifier of the parameter (param_ident), the number of the condition (cond_number, if multiple condition)

for a single condition: the measured value of the parameter, its threshold and its hysteresis, the operator (<, >, =, !=).

The initiation of an action is handled by a basic function: see below with the basic functions "ActionCondParam" and "ActionCondMultiple".

As for the processing of the log files ("logs") of the applications, for each specific module, any error specified in the file "ERROR_CONTROL" which appears in a "log" file of the object ("alert.log", "ULOG", etc.) generates the execution of an action. For each object to be monitored, the administrator specifies the list of the files ("logs") to be scanned ("SCANLOG" in the command "CR_OBJECT" of the configuration) and an error control file ("error control file"). Default values are provided. This error control file describes the errors to be selected (for example "ora_err"), and the error class associated with each error. This error class will be transmitted to the action linked to the condition of the predefined parameter "PARAM_LOG" and will be used for a finer branching of the sequence of operations to be carried out which consists, for example, of saving "trace" files or supplementary information. The sequence of operations in the action is predefined but can be written entirely by the administrator. It is important to remember that any action triggered results in a recording ("logging") in the file "actionlog", in this case with the error message. An example of an error control file ("error_control_file") is offered below:

"ORA-0603": ACT_RESTART1
"ORA-1600": ACT_INCREASE_ARCHIVE
. . .

Before starting the specific modules, the generic agent generates a configuration "RSF" for each object if the file "SCANLOG" is described for the object.

if the file "LOGFILE" describes the path names of the log files ("logpathname"): an entry in the configuration "RSF" by the path name of the log file ("logpathname").

if the file "LOGFILE" is not described, the generic agent calls a function of the specific module ("mstype" is the type of the specific module) "<mstype>_build_ lognames (object_entry, lognames_array)" which returns a list of the names of files to be scanned, such as for example with Oracle:

$dbhome/rdbms/log/alert_<sid>.log,
$dbhome/network/log/listener.log.$dbhome/
sqlnet.log. etc. The generic agent will, for example, call the Tuxedo application every day just after midnight, since the name of the file "log" contains the date of the day.

The configuration "RSF" is customized by the file "error_control_file". If an error is found in a log file path name ("logpathname") a message is generated to the file "Applicationjournal" and a message is generated in the file "error_param_<mstype>" in the node to be monitored and in the file "AS_scanlog" in the directory "GUI_FILES_ DIR" in the management node, with the format:

object_id err_code act_class logpathname line_ containing_|_error.

Next, the generic agent starts the processing of the configuration "RSF".

The specific module has a predefined parameter "PARAM _LOG" (which is ignored if the option "SCANLOG" does not exist for the objet). In this case, it performs a measurement which consists of reading a message in the file "error_ param_"<mstype>" in the node to be monitored, for the current object identifier ("object_id"). If the expressed condition "message found" is true, the associated action is called, with the following as arguments: the standard context, the error code ("error_code"), the action class ("act_class") the log file path name ("logpathname") and the "line_containing_|_error". The predefined action will make it possible to record the fact that the line has been found. This predefined action can be replaced by the administrator with an external action.

As for the offline analysis, the collection of the parameters occurs in a parameter file in each node monitored. The true conditions are recorded in a "trace" file in each node monitored. An offline analysis of this type is used for archive management over a determined period, for the display of past activities, for the statistical reports (over a day/week/month/year and various zooms on the information related to the "system/DB/TP/EpochBackup/etc.") Statistics can thus be established by Tuxedo application or for any application, by data base instance, by "machine/cluster", etc. The collection and analysis of information for verifying that the tuning ("tuning", SGA, etc.) is always correct. The offline analysis can also be performed by returning the files "paramlog" and "actionlog" of each node "N_agent" to the node "N_admin". The offline analysis can also be carried out by importing the "trace" files of tools such as "DbaXpert" (Db*Activity, space monitor) or others.

The stopping of the monitor in the node "N_admin" stops the monitors in the nodes "N_agent."

It will be recalled here that the configuration of the monitoring is distributed in a filtered way from the management node to each autonomous agent of each node to be monitored at the moment this autonomous agent is activated, it being understood that each node to be monitored has its own log files for parameters ("paramlog") and actions ("actionlog") as well as its own monitoring processes, while the management node itself also has files of the states of the objects monitored ("obj_state") and parameter display files ("display_params"). Each agent is automatically "reactivatible", which means that when an agent becomes active in a node, it begins by executing the command "mkitab" in order to place itself in the initialization table "inittab" so that it can be reactivated if the process dies or if the node malfunctions and is then reactivated. When an agent is deactivated, it executes the command "rmitab" so that it will not be reactivated, in which case the management node no longer recognizes it.

If a node to be monitored is declared unavailable or out of service, its objects (Oracle instance, Tuxedo application, etc.) to be monitored, which have been switched to a "backup" node, must be monitored by the autonomous agent in the backup node. A simple way to do this is to modify the configuration file in the backup node, replacing the name of the unavailable node with the name of the backup node, which means that the entire configuration is sent to the agents without suppressing the objects not monitored by an agent in a given node. The command for this purpose is: NewObject old_node_object_ident OBJECTS=(object_ident, object_ident, etc.), which makes it possible to make the new objects to be monitored, objects which had been monitored by the agent in the node that has become unavailable, known to the agent in the backup node. Only the objects (Oracle base, Tuxedo application, etc.) which were moved to the backup node are specified in "OBJECTS".

In a non-limiting way, the chief characteristics of certain specific modules are indicated below. Thus, relative to the module specific to FSX, it must be possible, among other things:

- to specify, for the process according to the invention, objects to be monitored relative to the file systems ("FILESYSTEM") and relative to pagination ("PAGING_SPACE").
- to call and to integrate interface GUI having the FSX configuration from the "Configuration" menu of the present process.
- to authorize operations such as the periodic checking of the free disk space and its extension.
- to modify the period of the check or to change the action if the check is positive.
- to measure parameters such as the utilization coefficient and the maximum size ("free_percent" and "max_size") using the predefined condition (if free_percent<config_min) and (max_size+incrsize<=config_max) then extension action.
- for the administrator to create conditions containing [if (condition) and if (objl.free_percent <n)] then . . .

Likewise, relative to the module specific to the Distributed Print Facility (DPF), it must be possible, among other things:

- to measure performance parameters (number of pages per hour, for example).
- to request a print job, to manage the print requests, to manage the queues and the devices.
- to start and stop the spooling in a node.
- to configure the spool files.
- to check the status of the spool files, the local queues, the devices and the print requests with the possibility, if a problem is encountered, of placing a message in a "log" file scanned by "RSF" which warns the administrator. These checks are performed by a "daemon" "dpf_status_check" in each node of the DPF domain.
- to check the status of the DPF servers and to automatically generate the action which corrects the abnormal status. A tool such as "lb_admin" finds the servers recorded and the "daemon" "dpf_server_chk" checks to see whether these servers respond. If they do not respond, they are automatically "killed" and the record is deleted, while a message is placed in the "log" file scanned by "RSF" which activates an alarm: an alarm (a "message displayed" window) or a dialog box for learning whether the administrator wishes a proposed action to be executed {with the result displayed in a window), the status (and detailed information) being fed back _r_: to the interface GUI for display, while it is also possible to change the period of certain tests (documented and identified "param_ident" by the specific module), to suppress a "check" parameter, and to indicate whether or not a "trace" is desired. The "daemons" are automatically initiated by the operating system ("process.init") and automatically restarted when a malfunction occurs. The name of the path "pathname" of the file "log" scanned by "RSF" is configurable.

- to call a management tool in the "Tools" menu, such as DbaXpert, Tux_GUI, Onperf, etc.
- to collect metrics.

The following is an exemplary implementation of the module specific to DPF:

- parameter DPF_SPOOLER_STATUS measures:

```
npstat -h <uname_node> 1> resultfile 2>npstat_errorfile
if ($? !=0)
    SendMsg (E, npstat failed, npstat_errorfile)
    rc= $?
if not
    process resultfile => System <spooler> <status>
    return current_param_value=status in(started, stopped,
    inconsistent, -)
condition 1:
if (GetDelta(current_obj, DPF_SPOOLER_STATUS, &val) !=0)
action1:
if (current_param_value != "started")
    DisplayState (current_obj, DPF_SPOOLER_STATUS,
    DPF_SPOOLER,
severe_color, current_param_value)
    SendMsg (A, <spooler> is <current_param_value>)
if not
    DisplayState (current_obj, DPF_SPOOLER_STATUS,
    DPF_SPOOLER,
ok_color, current_param_value)
    SendMsg (W, <spooler> is <current_param_value>)
```

- parameter DPF_QUEUE_INSTATUS measures:

```
npstat -h <uname_node> 1> resultfile 2>npstat_errorfile
if ($? != 0)
    SendMsg (E, npstat failed, npstat_errorfile)
    rc = $?
if not
    process resultfile => Queue <queue_name> <instatus>
<outstatus> <requests>
    return current_param_value=instatus in (accepting, rejecting)
condition 1:
if (GetDelta(current_obj, DPF_QUEUE_INSTATUS, &val) !=0)
```

```
action 1:
if (current_param_value != "accepting")
    DisplayState (current_obj, DPF_QUEUE_INSTATUS,
    DPF_QUEUE,
warning_color, current_param_value)
    SendMsg (W, <queue_name> is <current_param_value>)
if not
    DisplayState (current_obj, DPF_QUEUE_INSTATUS,
    DPF_QUEUE,
ok_color, current_param_value)
    SendMsg (W, <queue_name> is <current_param_value>)
    - parameter DPF_QUEUE_OUTSTATUS
measures:
npstat -h <uname_node> 1> resultfile 2>npstat_errorfile
if ($? != 0)
    SendMsg (E, npstat failed, npstat_errorfile)
    rc= $?
if not
    process resultfile => Queue <queue_name> <instatus>
<outstatus> <requests>
    return current_param_value=outstatus in (started, stopped)
condition 1:
if (GetDelta(current_obj, DPF_QUEUE_OUTSTATUS, &val) != 0)
action 1:
if (current_param_value != "started")
    DisplayState (current_obj, DPF_QUEUE_OUTSTATUS,
    DPF_QUEUE,
warning_color, current_param_value)
    SendMsg (W, <queue_name> is <current_param_value>)
if not
    DisplayState (current_obj, DPF_QUEUE_OUTSTATUS,
    DPF_QUEUE,
ok_color, current_param_value)
    SendMsg (W, <queue_name> is <current_param_value>)
    - parameter DPF_QUEUE_REQUEST_STATUS
measures:
npstat -h <uname_node> 1> resultfile 2> npstat_errorfile
if ($? != 0)
    SendMsg (E, npstat failed, npstat_errorfile)
    rc= $?
if not
    process resultfile => Queue <queue_name> <instatus>
<outstatus> <requests>
    if (requests> 0)
        res_npshow= npshow -S queue=<queue_name> 2>
            npshow_errorfile
        if ($? != 0)
            SendMsg (E, npshow failed, npshow_errorfile)
            return rc = $?
        if not
            process res_npshow => nb_active
            if (nb_active = 0)
                return current_param_value=waiting
            if not return current_param_value=ok
    if not return current_param_value=ok
condition 1:
if (getDelta(current_obj, DPF_QUEUE_REQUEST_STATUS,
&val) != 0)
action 1:
if (current_param_value = "waiting")
    DisplayState (current_obj, DPF_QUEUE_REQUEST_STATUS,
DPF_QUEUE, warning_color, current_param_value)
    SendMsg (W, there are some requests waiting on <queue_name>
queue, but non is active)
    - parameter DPF_DEVICE_STATUS
measures:
npstat -h <uname_node> 1> resultfile 2>npstat_errorfile
if ($? != 0)
    SendMsg (E, npstat failed, npstat_errorfile)
    rc = $?
if not
    process resultfile => Device <device_name> <status>
    return current_param_value=status in(idle_busy, disabled,
paper_load, unbound, paper_empty, problem, suspended)
condition 1:
if (GetDelta(current_obj, DPF_DEVICE_STATUS, &val) !=0)
action 1:
if (current_param_value != "idle_busy")
    if (current_param_value=("problem" or "suspended"))
```

```
        DisplayState (current_obj, DPF_DEVICE_STATUS,
DPF_DEVICE, severe_color, current_param_value)
            SendMsg (A, <device_name> device is in abnormal state
<current_param_value>)
        if not
            DisplayState (current_obj, DPF_DEVICE_STATUS,
DPF_DEVICE, ok_color, current_param_value)
            SendMsg (W, <device_name> device is <current_param_value>)
    if not
        DisplayState (Current_obj, DPF_DEVICE_STATUS,
DPF_DEVICE, ok_color, current_param_value)
            SendMsg (W, <device_name> device is <current_param_value>)
```

Also, relative to the module specific to Oracle, it must be possible, among other things, to control access to objects in order to prevent any lockout or suspension ("abort") of the application if the latter wishes to access the base or the Oracle objects. Certain information linked to space ("extents", "free list", etc.) is also controlled. Moreover, the collection of Oracle metrics is also authorized. The measurements are only performed globally and not on a particular table space ("tablespace") or process. This means that it is not possible to measure, for example, the number of blocks allocated for the table space "SYSTEM". However, the user can create a parameter and specify the command to be executed, such as for example,

```
CREATE_PARAM or716, ts_SYSTEM_blocks,
MEASURE=(SPECIF_FILE,
'x/y/z.sql') [TRACE], PERIOD=12h, [CONDITION=((# > 320)
ACTION=(UNIX_FILE, 'x/y/'))]:
```

The following is an exemplary implementation of the module specific to Oracle:

Relative to the predefined conditions and parameters:

ORA_CONNECT: to make a connection "<connect_string>". The value of the parameter is 0 (OK) or 2 ("connect" impossible). If the connection is impossible, the default action is to restart the base once. To choose the measurements most useful for meeting to objectives of the product: prevention/detection of space or performance problems, aid for estimating the growth of the base over time. A choice of or among the following measurements ("source DbaXpert" and "server manager"):

measurements on the activity of the server:

connected_user_count, session_count, waiting_session_count, current_open cursors, logical_reads, physical_io, user_commits, recursive_calls.

measurements on the input/output data files:

df_physical_reads, df_physical_writes, df_physical_block_reads, df_physical_block_writes.

measurements on the tuning of the cache ("cache_tuning"):

logical_reads, ddc_gets, free_buffer_requested, ddc_getmisses, free_buffers_inspected, physical_reads, ddc_get_hitratio, buffer_cache_hitratio measurements on the transactions:

active_transactions, rs_gets, rs_waits, redo_writes, redo_blocks_written, user_locks_count, user_rollbacks measurements on the states:

> cumulated_opened_cursor, parse_count, long_table_scans, short_table_scans, table_fetch_by_rowid, table_scan_rows_gotten, memory_sorts, disk_sorts.

measurements on the latches:

> latch_gets, latch_misses, latch_hitratio.

measurements on the processes:

> see v$dispatcher, v$shared_server, v$process.

measurements on the table spaces ("tablespaces"): see "space monitor".

ORA_ROW_CHAINING:

For each table, measurement of the number of chained rows ("row chaining") then testing relative to a threshold; by default, the agent feeds back an alarm to the history log of the product. DbaXpert/space monitor is called and the alarm TA0 is configured with –s ORA_TA0.sh (script to be called if alarm, which sends an alarm to the history log of the product) and –d 0 (no feedback of an alarm to DB*Control).

if no explicit condition exists on this parameter: enter "monitor table symptom=(TA0)", if an explicit condition with "IGNORE" exists on this parameter: do nothing, if an explicit condition exists on this parameter which is not combined with any other conditions, enter "monitor table symptom=(TA0, threshold [,hysteresis])", if an explicit condition exists on this parameter which is combined with other conditions: enter "monitor table symptom=(TA0, threshold [,hysteresis])"

access to the objects:
param_ident=HEALTH. Access to the bases (by SQL connect, the DB string user/passwd@dbstring dbc/dbc@T:or714 is supplied by the user). If the connection is KO: action ORA_CONN_FAIL and recording in the file "actionlog".

verifies whether the data bases have started up exclusively (due to "DBA" oversight). The alarm level ("info", "warning", "critical") is defined by the user. Action "ORA_EXC_MOUNT". Recording in "trace_params".

if "ARCHIVELOG", tests whether the "process background arch" is running; if not, data base is blocked as soon as the "redo log" files are full. Action "ORA_ARCH_STOP" and recording in "trace_params".

detects and corrects the saturated "log" file archives. Correction by backing up a number of archives such as a free space threshold is guaranteed in the file system.

monitors the "background processes", verifies that the Oracle instance is stopped normally ("normal shutdown") if stopped.

detects whether SQL*net is down and ensures its restart.

detects whether an instance (its "background processes" and other processes) is down and ensures its restart.

space mgt: it is necessary to anticipate the possible lockout situations, and not to deal with optimizing performance; this is handled by "DbaExpert".

Lockouts can occur if a table (or an index, "cluster", "rollback sgt") has reached its maximum extension ("MAXEXTENTS"), if the maximum size of a fragment is too small to allocate the next "extent", or if the data base files ("dbfiles") are full. Action in this case.

Per "tablespace", is the fill rate of the dbfiles>threshold x? If yes, action "ORA_FREE_TS".

calculates the maximum size of the fragments. If lower _n: than the value of the next "extent" then action "ORA_MAX_FRG" and recording in the file "actionlog".

comparison of the actual number of "extents" with the maximum allowed "MAXEXTENTS" (defined at the creation of the object, in the clause "STORAGE"). In this case, the application using the table will be suspended ("abort"). This incident must be prevented. Action "ORA_MAX_EXT" if the object reaches its "maxextents". Recording in "actionlog".

status of the disks holding Oracle files: a disk failure must result in a return of an Oracle code (corrupted block) and only the application retrieves it. If detected, it must be indicated to the administrator.

. . . {ORA_MAX_FREE_EXTENT_SIZE, object_ident, tablespacename, value_I, value_W, value_C
! ORA_MAX_EXTENTS, object_ident, username.objectname, {sever_I sever_W|sever_C}
! ORA_FULL_DEFILES, object_ident, tablespacename, value_I, value_W, value_C
} number of Oracle transactions per second, for a given node, for a given instance: Display,
Parameter ora_tps, <object_ident>,
command={SQL, 'sql_tx'}, FREQUENCY=30
DISPLAY={'number of TPS ora_simuload'};
with sql_tx: select gets/2 from v$latch where latch#=20.
condition: if this rate decreases substantially and the number of users connected does not decrease, then initiate an action which could be a more detailed zoom of parameters, a recording of information, a backup of "trace" files, a finer collection, etc.)

average number of shared Oracle servers, for a given node, for a given instance. No display.
Parameter ora_shared_srv, <object ident>, command={SQL,'sql_srv S0'}, FREQUENCY=30;
with sql_srv:select count(*) from v$process where program like '%(S1%';

average number of Oracle users connected, for a given node, for a given instance. No display.
Parameter ora_sessions, <object_ident>,
command={SQL, 'sql_sessions'}, FREQUENCY=30;
with sql_sessions: select count(*) from v$session where status='ACTIVE' AND lockwait is not NULL;

dispatcher

If a dispatcher is very busy ("delta(v$dispatcher.busy)/delta(t)>50%") and the cpu utilization rate of the node is not too high (<80%), then it is necessary to add a dispatcher with the same protocol (automatic action or recommendation).

If the wait time/number of responses ("v$queue.wait/v$queue.totalq") in the response queue of the dispatcher is increasing regularly and the cpu utilization rate of the node is not too high (<80w), then it is necessary to add a dispatcher with the same protocol (automatic action or recommendation).

When oraSIDCurrentConnectedClients=oraSIDReservedConnections, then the dispatcher connection requests go to dedicated servers.

To monitor the number of connections (average, current) in each dispatcher and in each shared server.

If oraDispatcherRejectedConnections increases greatly, monitor oraDispatcherState (BLOCKED, READY).

If oraPrespawnedSrvRejectedConnections increases greatly, monitor oraPrespawnedState (BLOCKED, READY).

If oraPrespawnedSrvProcessorID is the process ID: make the connection with the consumption of system resources.

inputs/outputs:

if improper distribution of the inputs/outputs in the commands ("drives") at the system level: then look at the distribution of the inputs/outputs per instance and in the data base files.

Likewise, relative to the module specific to Tuxedo, it must be possible, among other things, to monitor the status of the Tuxedo applications, the servers, the queues, and the network using the command "tmadmin psr, psc, pq, print_net". For Tuxedo, the administrative servers ("BBL", "DBBL", "Bridge") and the applications are monitored. Access to the various nodes of the Tuxedo application (sharing of the network) and the queues used by the application are enabled. If the application calls transactions of a determined machine, this determined machine is enabled.

The following is an exemplary implementation of the module specific to Tuxedo: generation in the file "objstate", via the basic function "DisplayState":

```
TUXEDO:<severity_level>:<appname>:NIL:<global_id>
TUX_MASTER:<severity_level>:<node>:<appname>:<tux_father_id>
[TUX_NODE:<severity_level>:<node>:<appname>:<tux_father_id>]
[TUX_QUEUE:<severity_level>:<qname>:<appname>:<tux_father_id>]...
[TUX_DOMAIN:<severity_level>:<domain_name>:<appname>:<tux_father_
     id>]...
with
the line TUXEDO is generated as a function of the daughter lines
TUX-MASTER, TUX_NODE, etc.
TUX_NODE: one line per Imid other than master.
TUX_QUEUE: one line per QSPACE (tbc).
TUX_DOMAIN: one line per domain.
     - parameter TUX_xx_STATUS
...
``` number of service requests (transactions) per second, for a given node, for a given Tuxedo application: to total up the #RqDone of the servers other than "BB:", "DBBL", "BRIDGE", "ITMS*" . Display.

Parameter SVC_<node>, <object_ident>,
command={SHELL, 'tmadmin srv node'}, FREQUENCY=30
DISPLAY={'number of TPS simuload'};;
with tmadmin_srv: tmadmin ...psr+filter on node+delta (#RqDone) relative to the last collection, division by the frequency.

average number of active clients, for a given node, for a given Tuxedo application. No display.
Parameter CLT_<node>, <object_ident>,
command={SHELL, 'tmadmin_clt node'}, FREQUENCY=30;
with tmadmin_clt: tmadmin ... pclt+filter on node+number of busy client lines (BUSY).

for a given server in a given node: the average number of queued requests, per queue. To be done for all the servers. No display. Makes it possible to know if the number of duplicated servers has changed. If the average number of queued requests is >10 (the example 10 is slightly greater than the average number of active clients requesting a service from the server) then action to add a server (up to the max).

Parameter SRVREQ_<srvname>_<node>, <object_ident>,
command={SHELL, 'tmadmin_srvreq node srvname'}, FREQUENCY=60
CONDITION_S==&1>10};
with tmadmin+srvreq: tmadmin . . . pq+filter on srvname+field Queued. Total up the "QUEUED" in the n servers in the node, divide by the number of queues.
with the action:
SRVREQ_<srvname>_<node>:
if cpu <node><80% then tmboot −s <srvname>−i num (number calculated with tmadmin psr to find out the actual srvids).

for a given server in a given node: the average number of application servers in a given node, for a given Tuxedo application. No display. To be correlated with the size of the queue.
Parameter SRVNB_<srvname>_<node>, <object-ident>,
command={SHELL, 'tmadmin_srvng node srvname'}, FREQUENCY=60;
with tmadmin_srvnb:tmadmin . . . psr+filter on srvname.

for a given service in a given node, for a given Tuxedo application: the number of requests made per quarter hour. To be done for all the services. No display. For measuring the utilization of services.
Parameter SVCDREQ_<svcname>_<node>, <object_ident>,
MEASURE={UNIX_FILE, 'tmadmin_svcreq node svcname'}, PERIOD=900;
with tmadmin_svcdreq: tmadmin . . . psc+filter on svcname+delta (#Done) relative to the last collection, division by the frequency. Total the #Done if the service is in n servers in the node.

The Tuxedo administrator assigns a weight to the services and uses it to equilibrate the load. These weights are not necessarily well chosen, especially over time. These weights must be adjusted automatically as a function of administrative criteria.

Also, relative to the module specific to "xcp2", it must be possible, among other things, to use the command "/usr/xcp2/up/dac_lu62 -a DSPSESST" to find out the status of the group ("pool") "xcp2".

Finally, relative to specific module "system", it must be possible, among other things, to monitor and measure the cpu time, the disk space, the inputs/outputs, the storage, the exchange rate, the number of users, the pagination, the network, etc. Thus it is possible, for example, to measure the cpu utilization per second, with default display, or the input/output rate per second, or to identify the processors which are the largest users of cpu and collect them in order to perform an autonomous analysis ("offline", tbc).

In conclusion, according to the present monitoring process, the use of autonomous agents makes it possible to ensure the proper running of the applications monitored in all of the nodes by means of an autonomous and efficient decision processing applied locally to the objects to be processed, when necessary to very rapidly feed back the useful information from the nodes to be monitored to the management node, and to automatically initiate actions on certain conditions or possibly to recommend an action. In this way, an effective monitoring of the objects functioning in the plurality of nodes is ensured and a significant increase in performance is obtained due to the independent capacity available to the various autonomous agents in their operation, the process applied in this case making it possible to measure specific parameters of each object, to test conditions on these parameters relative to thresholds, and then to execute an action in order to warn of a problem, to reconfigure or to correct. Measurements are collected in order to perform a later analysis for purposes of a statistical examination of the activity monitored. These collected measurements relate to all the types of objects to be monitored, for example, in this case instances such as data bases like Oracle or Informix, applications such as Tuxedo, various machines or any one machine, a Distributed Print Facility (DPF), etc. Also, the synthetic aspect of a defined generically global object offers substantial freedom of action and allows efficient use of the tree structure concept with a great deal of precision relative to the evolution of the display granularity obtained. Correlations can be made between a plurality of different measurements, particularly between different object types, which means that intertype correlation is advantageously provided. Moreover, this process is portable to different platforms, due to its total independence from its operating environment, since the display occurs by means of a graphical interface specific to this process. This process is also able to allow any interfacing with any management system, offering the user integrated management, since the autonomous agents access different information through the existing standard protocols.

What is claimed is:

1. A process for monitoring from a management node in a data processing system a plurality of object types of a plurality of nodes comprising:

configuring and then distributing monitoring functions in a filtered way from the management node to at least one autonomous agent installed on each node to be monitored, each autonomous agent comprising a plurality of monitoring modules specific to different object types or to a particular domain, wherein after said distributing step said at least one agent operates independently without direct control from the management node providing intertype correlation to an autonomous agent to locally process the different object types or all of the objects of a domain defined as a global object or to feed back information to be displayed to a graphical interface of the management node, measuring, by each specific monitoring module, static and dynamic parameters particular to the object type that the specific monitoring module monitors, collecting the measurements, said collecting being performed by said autonomous agents;

testing conditions on said dynamic parameters relative to predefined thresholds, said testing being performed by said autonomous agents;

initiating actions associated with said tested conditions, which parameters, conditions and actions can be modified by a user of the management node.

2. A monitoring process according to claim for the application of which the management node includes, a graphical user interface for the display of the selected objects and the display of parameter value curves, a configuration file containing all of the configurations of the objects with the description of said objects as well as all of the predefined static or dynamic parameters, further including the steps of analyzing the configuration file and dynamically modifying or adding to status files of the nodes to be monitored and parameter display files, and storing the parameters measured in a trace file for display through the graphical interface.

3. A monitoring process according to claim 1, for the application of which the autonomous agent installed in each node to be monitored is composed of a generic agent related to a plurality of specific modules, each of which is specific to an object type or to a particular domain, said autonomous agent being composed of files containing the basic functions used so as to avoid loading files after the configuring and then distributing monitoring functions, each node to be monitored also having separately designated files for the respective node, including files of parameters, conditions and associated actions for controlling its own monitoring and for processing of the different object types, the further step of measuring the parameters, evaluating the conditions and initiating the actions linked to the conditions for all the objects described.

4. A monitoring process according to claim 2, for the application of which the autonomous agent installed in each node to be monitored is composed of a generic agent related to a plurality of specific modules, each of which is specific to an object type or to a particular domain, and of files containing the basic functions used, each node to be monitored also having its own files of parameters, conditions and associated actions for controlling its own monitoring and for processing of the different object types, the further step of measuring the parameters, evaluating the conditions and initiating the actions linked to the conditions for all the objects described.

5. A monitoring process according to claim 2, for the applicaton of which, when a condition that is not linked to a parameter relates to one or more parameters and thus to one or more objects, processing said condition in the management node by a generic management agent which processes the conditions in a plurality of nodes, the generic management agent initiating the action in the management node.

6. A monitoring process according to claim 3, for the application of which, when a condition that is not linked to a parameter relates to one or more parameters and thus to one or more objects, processing said condition in the management node by a generic management agent which processes the conditions in a plurality of nodes, the generic management agent initiating the action in the management node.

7. A monitoring process according to claim 6, in which the operation of the generic management agent occurs in the following way:

reading of the generic management agent configuration file, syntactic and semantic analysis, merging of the configuration file supplied by the management node and the configuration file supplied by the specific modules, sending the resulting configuration file to each agent, filtering relative to the objects to be monitored in the node and taking into account problems inherent to malfunctioning nodes or to nodes provided for backing up the data of a malfunctioning node in another node.

8. A monitoring process according to claim 6, in which the operation of the generic management agent occurs in the following way:

reading of the generic management agent configuration file, syntactic and semantic analysis, merging of the configuration file supplied by the management node and the configuration file supplied by the specific modules, sending the resulting configuration file to each agent, filtering relative to the objects to be monitored in the node and taking into account problems inherent to malfunctioning nodes or to nodes provided for backing up the data of a malfunctioning node in another node.

9. A monitoring process according to claim 7, in which the operation of the generic agent of a node to be monitored occurs in the following way:
reading of the generic management agent configuration file, only the objects local to this node being processed,
constructing an object table,
constructing a parameter configuration table,
constructing a parameter value table:
each parameter of each object having at least one place for storing its value or values, the number of places to be reserved for said parameter of said object having been calculated,
supplying a multiple condition table,
supplying the basic functions for the use of the specific modules for some functions and for external actions for other functions,
starting operation of the specific modules having an object to be monitored,
some specific modules having their own operation, while others being grouped in a single operation,
configuring a file monitoring service so as to allow a log file scanning operation of all objects described,
evaluating of each multiple condition, with its period:
by searching for the values of the parameters in a table of parameter values or via a basic function, and
if the multiple condition is true, initiating the internal or external action, and
verifying the proper functioning of the specific modules, sending of a special parameter and wait for the response.

10. A monitoring process according to claim 8, for which the operation of the generic agent of a node to be monitored occurs in the following way:
reading of the generic management agent configuration file, only the objects local to this node being processed,
constructing an object table,
constructing a parameter configuration table,
constructing a parameter value table:
each parameter of each object having at least one place for storing its value or values, the number of places to be reserved for said parameter of said object having been calculated,
supplying a multiple condition table,
supplying the basic functions for the use of the specific modules for some functions and for external actions for other functions,
starting operation of the specific modules having an object to be monitored,
some specific modules having their own operation, while others being grouped in a single operation,
configuring a file monitoring service so as to allow a log file scanning operation of all objects described,
evaluating of each multiple condition, with its period:
by searching for the values of the parameters in a table of parameter values or via a basic function, and
if the multiple condition is true, initiating the internal or external action, and
verifying the proper functioning of the specific modules, sending of a special parameter and wait for the response.

11. A monitoring process according to claim 9, for which the operation of a specific module occurs in the following way:
scanning of the parameter configuration table, processing only its own objects:
sorting already sorted parameters in increasing period order, and
for each parameter of each object, according to the period performing the measurement using an internal command corresponding to a predefined parameter or external command, placing the measurement in the parameter value table, and
if an analysis is executed, storing the value in the global trace file of the autonomous agent,
if a display is required, displaying the value or the status,
evaluating the single condition, and if the single condition exists, and initiating an internal or external action if the condition is true, and
processing unexpected requests for real-time parameter measurement.

12. A monitoring process according to claim 11, for which the operation of the generic agent of a node to be monitored occurs in the following way:
reading of the generic management agent configuration file, only the objects local to this node being processed,
constructing an object table,
constructing a parameter configuration table,
constructing a parameter value table:
each parameter of each object having at least one place for storing its value or values, the number of places to be reserved for said parameter of said object having been calculated,
supplying a multiple condition table,
supply the basic functions for the use of the specific modules for some functions and for external actions for other functions,
starting operation of the specific modules having an object to be monitored,
some specific modules having their own operation, while others being grouped in a single operation,
configuring a file monitoring service so as to allow a log file scanning operation of all objects described,
evaluating of each multiple condition, with its period:
by searching for the values of the parameters in a table of parameter values or via a basic function, and
if the multiple condition is true, initiating the internal or external action, and
verifying the proper functioning of the specific modules, sending of a special parameter and waiting for the response__.

13. A monitoring process according to claim 9, in which, when a predefined or external action requests the value of a parameter of an object monitored by a node other than the node in which the action is executed, transferring said request by the basic function which requests the value to the management node and then directing said request to the appropriate node, while the value is returned in-the reverse direction.

14. A monitoring process according to claim 12, in which, when a predefined or external action requests the value of a parameter of an object monitored by a node other than the node in which the action is executed, transferring said request by the basic function which requests the value to the management node and then directing said request to the appropriate node, while the value is returned in the reverse direction.

15. A monitoring process according to claim 13, in which one of the basic functions presented is provided for returning to the management node the parameter log files as well as the action log files of each node monitored, for the independent analysis performed by the management node.

16. A monitoring process according to claim 14, in which one of the basic functions presented is provided for returning to the management node the parameter log files as well as the action log files of each node monitored, for the independent analysis performed by the management node.

17. A monitoring process according to claim 11, for which the processing of a parameter is carried out as follows:
- if the parameter is valid and the period determined, then the measurement is executed,
- if a condition on a parameter exists and the parameter is valid, then the condition is evaluated.

18. A monitoring process according to claim 12, for which the processing of a parameter is carried out as follows:
- if the parameter is valid and the period determined, then the measurement is executed,
- if a condition on a parameter exists and the parameter is valid, then the condition is evaluated.

19. A monitoring process according to claim 13, for which the processing of a parameter is carried out as follows:
- if the parameter is valid and the period determined, then the measurement is executed,
- if a condition on a parameter exists and the parameter is valid, then the condition is evaluated.

20. A monitoring process according to claim 14, for which the processing of a parameter is carried out as follows:
- if the parameter is valid and the period determined, then the measurement is executed,
- if a condition on a parameter exists and the parameter is valid, then the condition is evaluated.

21. A monitoring process according to claim 15, for which the processing of a parameter is carried out as follows:
- if the parameter is valid and the period determined, then the measurement is executed,
- if a condition on a parameter exists and the parameter is valid, then the condition is evaluated.

22. A monitoring process according to claim 16, for which the processing of a parameter is carried out as follows:
- if the parameter is valid and the period determined, then the measurement is executed,
- if a condition on a parameter exists and the parameter is valid, then the condition is evaluated.

23. A monitoring process according to claim 11, for which the processing of the actions is carried out as follows:
- wherein the generic agent and the specific modules request to initiate an action is predefined or supplied from the outside,
- any action receives arguments which represent the context that triggers the action, and in the case of a multiple condition, the object identifier, the parameter identifier, the number of the condition, and
  - in the case of a single condition, the measured value of the parameter, its threshold and its hysteresis, the operator.

24. A monitoring process according to claim 12, for which the processing of the actions is carried out as follows:
- wherein the generic agent and the specific modules request to initiate an action predefined or supplied from the outside,
- any action receives arguments which represent the context that triggers the action, and in the case of a multiple condition, the object identifier, the parameter identifier, the number of the condition, and
  - in the case of a single condition, the measured value of the parameter, its threshold and its hysteresis, the operator.

25. A monitoring process according to claim 13, for which the processing of the actions is carried out as follows:
- the generic agent and the specific modules request to initiate an action is predefined or supplied from the outside,
- any action receives arguments which represent the context that triggers the action, and in the case of a multiple condition, the object identifier, the parameter identifier, the number of the condition, and
  - in the case of a single condition, the measured value of the parameter, its threshold and its hysteresis, the operator.

26. A monitoring process according to claim 14, for which the processing of the actions is carried out as follows:
- wherein the generic agent and the specific modules request to initiate an is action predefined or supplied from the outside,
- any action receives arguments which represent the context that triggers the action, and in the case of a multiple condition, the object identifier, the parameter identifier, the number of the condition, and
  - in the case of a single condition, the measured value of the parameter, its threshold and its hysteresis, the operator.

27. A monitoring process according to claim 15, for which the processing of the actions is carried out as follows:
- wherein the generic agent and the specific modules request to initiate an action is predefined or supplied from the outside,
- any action receives arguments which represent the context that triggers the action, and in the case of a multiple condition, the object identifier, the parameter identifier, the number of the condition, and
  - in the case of a single condition, the measured value of the parameter, its threshold and its hysteresis, the operator.

28. A monitoring process according to claim 16, for which the processing of the actions is carried out as follows:
- the generic agent and the specific modules request to initiate an action is predefined or supplied from the outside,
- any action receives arguments which represent the context that triggers the action, and in the case of a multiple condition, the object identifier, the parameter identifier, the number of the condition, and
  - in the case of a single condition, the measured value of the parameter, its threshold and its hysteresis, the operator.

* * * * *

UNITED STATES PATENT AND TRADEMARK OFFICE
CERTIFICATE OF CORRECTION

PATENT NO. : 6,122,664
DATED : September 19, 2000
INVENTOR(S) : Boukobza, et. al.

It is certified that error appears in the above-identified patent and that said Letters Patent is hereby corrected as shown below:

IN THE CLAIMS:

Claim 2, line 54, after "Claim" insert --1--

Claim 12, line 48, delete " __ " after response.

Claim 13, line 55, delete "_" between in the

Signed and Sealed this

Twenty-second Day of May, 2001

Attest:

NICHOLAS P. GODICI

Attesting Officer

Acting Director of the United States Patent and Trademark Office